(12) United States Patent
Golla et al.

(10) Patent No.: US 10,164,953 B2
(45) Date of Patent: Dec. 25, 2018

(54) CLIENT ACCESSIBLE SECURE AREA IN A MOBILE DEVICE SECURITY MODULE

(71) Applicant: STMicroelectronics, Inc., Coppell, TX (US)

(72) Inventors: Prasad Golla, Bridgewater, NJ (US); Francesco Varone, Hillsborough, NJ (US)

(73) Assignee: STMICROELECTRONICS, INC., Coppell, TX (US)

( * ) Notice: Subject to any disclaimer, the term of this patent is extended or adjusted under 35 U.S.C. 154(b) by 451 days.

(21) Appl. No.: 14/870,872

(22) Filed: Sep. 30, 2015

(65) Prior Publication Data

US 2016/0099923 A1    Apr. 7, 2016

Related U.S. Application Data

(60) Provisional application No. 62/060,490, filed on Oct. 6, 2014.

(51) Int. Cl.
*H04L 29/06* (2006.01)
*H04W 12/04* (2009.01)
(Continued)

(52) U.S. Cl.
CPC .......... *H04L 63/061* (2013.01); *H04L 9/3234* (2013.01); *H04L 63/0492* (2013.01);
(Continued)

(58) Field of Classification Search
CPC ............. H04L 2209/80; H04L 63/0853; H04L 63/061; H04L 63/0492; H04L 63/168;
(Continued)

(56) References Cited

U.S. PATENT DOCUMENTS

2002/0040936 A1\* 4/2002 Wentker .................... G06F 8/60
235/492
2010/0088518 A1    4/2010 Dottax et al.
2014/0140507 A1\* 5/2014 Park ...................... H04W 8/245
380/247

FOREIGN PATENT DOCUMENTS

CN         101729502 A    6/2010
CN         103107881 A    5/2013
(Continued)

OTHER PUBLICATIONS

GSM Association, "Embedded SIM Remote Provisioning Architecture Version 1.1," Official Document 12FAST.13, Dec. 17, 2103, 84 pages.

(Continued)

*Primary Examiner* — Brian F Shaw
(74) *Attorney, Agent, or Firm* — Seed IP Law Group LLP

(57) ABSTRACT

A security module has an assigned unique electronic identifier. The security module has a communication interface, a non-volatile memory, and a processing unit coupled to the communication interface and the non-volatile memory. One or more unassigned secure domains are formed in the non-volatile memory, and each of the unassigned secure domains has an assigned unique application identifier (AID). Each of the unassigned secure domains is accessible via a respective first security value, and using the respective first security value, each of the unassigned secure domains can be assigned to a service provider before or after the security module is deployed.

20 Claims, 10 Drawing Sheets

(51) Int. Cl.
  *H04L 9/32* (2006.01)
  *G06F 21/53* (2013.01)
  *H04W 12/08* (2009.01)

(52) U.S. Cl.
  CPC ........ *H04L 63/0853* (2013.01); *H04L 63/168* (2013.01); *H04W 12/04* (2013.01); *G06F 21/53* (2013.01); *H04W 12/08* (2013.01)

(58) Field of Classification Search
  CPC ....... H04L 69/24; H04L 9/3234; G06F 21/50; G06F 21/53; H04W 12/04; H04W 12/08
  USPC .............. 713/168; 726/4, 6, 21, 27; 709/229
  See application file for complete search history.

(56) References Cited

FOREIGN PATENT DOCUMENTS

| | | |
|---|---|---|
| CN | 103975554 A | 8/2014 |
| EP | 2 048 594 A1 | 4/2009 |
| EP | 2 352 252 A1 | 8/2011 |
| EP | 2 741 548 A2 | 6/2014 |

OTHER PUBLICATIONS

ETSI, "Smart Cards; ETSI numbering system for telecommunication application providers (Release 11)," Technical Specification ETSI TS 101 220 V11.1.0, Sep. 2012, 35 Pages.
ETSI, "Smart Cards; UICC-Terminal interface; Physical and logical characteristics (Release 11)," Technical Specification ETSI TS 102 221 V11.0.0, Jun. 2012, 181 pages.
ETSI, "Integrated Circuit Cards (ICC); Administrative commands for telecommunications applications (Release 7)," Technical Specification ETSI TS 102 222 V7.0.0, Aug. 2006, 30 pages.
ETSI, "Smart Cards; Card Application Toolkit (CAT) (Release 12)," Technical Specification ETSI TS 102 223 V12.1.0, Sep. 2014, 244 pages.
ETSI, "Smart Cards; Secured packet structure for UICC based applications (Release 9)," Technical Specification ETSI TS 102 225 V9.0.0, Apr. 2010, 22 pages.
ETSI, "Smart Cards; Remote APDU structure for UICC based applications (Release 9)," Technical Specification ETSI TS 102 226 V9.2.0, Apr. 2010, 43 pages.
ETSI, "Smart Cards; Machine to Machine UICC; Physical and logical characteristics (Release 9)," Technical Specification ETSI TS 102 671 V9.0.0, Apr. 2010, 21 pages.
ETSI, "Smart Cards; Embedded UICC Requirements Specification; (Release 12)," Technical Specification ETSI TS 103 383 V12.0.0, Feb. 2013, 19 pages.
Global Platform, "GobalPlatform Card Specification Version 2.2.1," Document Reference: GPC_SPE_034, Jan. 2011, 303 pages.
Global Platform, "GlobalPlatform Card UICC Configuration Version 1.0.1," Document Reference: GPC_GUI_010, Jan. 2011, 50 pages.
Global Platform, "GlobalPlatform Card Confidential Card Content Management Card Specification. v2.2—Amendment A Version 1.0.1," Document Reference: GPC_SPE_007, Jan. 2011, 26 pages.
Global Platform, "GlobalPlatform Card Remote Application Management over HTTP Card Specification v2.2—Amendment B Version 1.1.1.3," Document Reference: GPC_SPE_011, Jan. 2014, 36 pages.
Global Platform, "GlobalPlatform Card Contactless Services Card Specification v2.2—Amendment C Version 1.0.1," Document Reference: GPC_SPE_025, Feb. 2012, 104 pages.
Global Platform, "GlobalPlatform Card Technology Secure Channel Protocol 03 Card Specification v2.2—Amendment D Version 1.1," Document Reference: GPC_SPE_014, Sep. 2009, 29 pages.
Global Platform, "GlobalPlatform Card Security Upgrade for Card Content Management Card Specification v2.2—Amendment E Version 1.0," Document Reference: GPC_SPE_042, Nov. 2011, 35 pages.
Global Platform, "GlobalPlatform Device Technology Secure Element Access Control Version 1.0," Document Reference: GPD_SPE_013, May 2012, 86 pages.
SIMalliance ltd., "Open Mobile API Specification V3.1," 2015, 80 pages.
Giesecke & Devrient GmbH, "White Paper: Bearer Independent Protocol (BIP)," 2006, 20 pages.
Giesecke & Devrient GmbH, "White Paper: The OTA Platform in the World of LTE," Jan. 2011, 14 pages.
Extended European Search Report, dated Feb. 24, 2016, for EP Application No. 15188479.8-1870, 14 pages.
Chinese Office Action and Search Report dated May 28, 2018, of corresponding Chinese Patent Application No. 201510647100.8 (with English Translation).

* cited by examiner

CLIENT ACCESSIBLE SECURE AREA IN A MOBILE DEVICE SECURITY MODULE

BACKGROUND

Technical Field

The present disclosure generally relates to secure communications between a remote network computing server and a mobile device. More particularly, but not exclusively, the present disclosure relates to a security module having a plurality of unassigned secure domains, each of the unassigned secure domains later assignable to a client.

Description of the Related Art

Generally speaking, remote servers host software applications that interact with other software applications executing on mobile communication devices such as smartphones. Service providers perform a key exchange ceremony with a security module issuer. One or more key diversification functions are then performed to derive other secret keys, which are used to encrypt secret information that will be communicated between the remote server and the mobile device. The encrypted information is passed from the remote server to the mobile network operator (MNO), and the MNO passes the data to the mobile device. In the mobile device, the subscriber identity module (SIM) is needed to decode each packet of secret information. Alternatively, the mobile device encrypts information using secret key data stored in the SIM and passes the encrypted information to the MNO, which forwards it to the remote server.

FIG. 1 illustrates conventional provisioning and security-card-based communication of secure data through a mobile network 10a. In FIG. 1, a secure communications infrastructure includes a mobile device 12 such as a smartphone associated with (e.g., having embedded or placed therein) a security module 14 such as a SIM card. The mobile device has a direct communicative relationship 16 with the security module 14. The communications may occur via a single wire protocol (SWP) bus, an I2C bus, serial peripheral interface (SPI) bus, or some other communication path and protocol.

The mobile device 12 in FIG. 1 is illustrated as a smartphone, but other devices are contemplated. For example, mobile device 12 may be embodied as a tablet computing device, a laptop computer, a multimedia device, exercise equipment, or in some other form. The mobile device 12 may be any computing device that is arranged to wirelessly communicate 18 over a wide area wireless network such as a cellular network that conforms to a 3G, 4G GSM protocol, long term evolution (LTE) protocol, a 5G protocol, or some other wireless communication network protocol. Typically, the wide area wireless network is administered by a network service provider 20, which is also called a mobile network operator (MNO).

The mobile device 12 communicates with the MNO 20 that provides the wireless mobile network services. The MNO 20 is closely aligned with data in the security module 14 and, most often, the MNO 20 provisions the initial data into the security module 14. Generally speaking, in communication sessions (e.g., phone calls, electronic mail, text messages, and the like) where the mobile device accesses services provided by the MNO 20, information from the security module 14 is passed to the MNO 20.

A secure element issuer-trusted service manager (SEI-TSM) 22 provides cryptographic tools and data 24 such as public and private keys and encryption/decryption algorithms to the MNO 20 and other entities, some of which are associated with the MNO 20. The SEI-TSM 22 could be the MNO 20, a silicon maker such as STMICROELECTRONICS, an original equipment manufacturer (OEM) that manufactures mobile devices, or some other entity. One valuable function performed by the SEI-TSM 22 is to establish a secure hypertext transfer protocol (HTTPS) link to the security module.

When a new set of relationships for a new service provider are being provisioned, the SEI-TSM 22 creates a new service provider secure domain (SPSD) in the security module. Security keys exchanged during a key ceremony are programmed for use in the secure domain and for further access by the service provider's trusted service manager. In some cases, the SEI-TSM 22 may also extradite the SPSD, which means the SEI-TSM may delete or otherwise give up its ability to read or write any data into the SPSD. After an SPSD of a security module 14 is extradited, the SEI-TSM 22 will pass secure (i.e., encrypted or otherwise obfuscated) packets to the security module originated from SP-TSM or otherwise, but the SEI-TSM 22 will not have any ability to view or otherwise interpret the data packets being passed.

A second trusted service manager coupled with a service provider (SP-TSM) 26 is separated from the SEI-TSM 22 by an optional interoperability facilitator 28. The interoperability facilitator 28 permits the sharing of disparate data structures, protocols, and the like between trusted service managers and other computing devices. The SP-TSM 26 is coupled through a same or different interoperability facilitator 28 to one or more service providers 32.

The SP-TSM 26 exchanges secure information with SEI-TSM 22. Keys from the SP-TSM can be programmed into an SPSD of the security module 14, and other keys associated with the SPSD are passed to the service provider 32. Broadly speaking, the SP-TSM 26 encrypts data with the keys that correspond to the SPSD, and it interprets data from the service provider. The SP-TSM 26 also formats the data from the service provider into application protocol data units (APDUs) that are recognized by the security module and unfolded by an application executing on the mobile device.

Service providers 32 conventionally include large national and international banking service providers such as the BANK OF AMERICA, and CITIGROUP, payment service providers such as VISA and MASTERCARD, large retailers such as APPLE, TARGET, and STARBUCKS, and others.

The system described in FIG. 1 is very complex and very expensive. In order to implement such a system, service providers 32 are required to acquire their own trusted service manager or pay for very expensive, customized access to a trusted service manager. That is, the SP-TSM 26 of FIG. 1 is necessary for a service provider to offer mobile payment to their customers, and so the service provider must set up their own SP-TSM 26, which is very expensive, or the service provider must contract for specific access to an SP-TSM 26, which is also very expensive.

The SP-TSM 26 forms a secure communicative relationship with the secure element issuer-trusted service manager (SEI-TSM) 22. Looking broadly at FIG. 1, the SP-TSM 26 forms a secure relationship with a particular service provider 32; and the SEI-TSM 22 forms a secure relationship through a network controlled by an MNO 20 with a security module 14. In this way, the service provider 32 is able to securely exchange secret information with the security module 14 over a particular customer. The security in the communicative relationship is enabled via the communication between the two trusted service managers, SP-TSM 26 and SEI-TSM 22. Accordingly, once the security module 14 is in use by a customer, new services can only be deployed through the connection between SP-TSM 26 and SEI-TSM 22.

Looking more closely, the process to pass secure data between the service provider 32 and the security module 14 becomes very complex. The relationship between the service provider and its associated SP-TSM 26 requires a particular security mechanism maintained and passed between the devices, and the relationship between the SEI-TSM 22 and the security module 14 also requires particular security keys maintained and passed between these devices. The trusted service managers pass encrypted data based on rotated keys, and the complexity to maintain secure and valid keys is performed through key exchange ceremonies, key diversification procedures, and key rotation techniques. With multiple applications on each device, and hundreds, thousands, and even millions of devices, the conventional process requires accurate timing, voluminous computing resources, a large communication bandwidth, and substantial power, among other things. This infrastructure is necessary because a generic HTTPS server such as implemented by a service provider 32 cannot securely talk to a security module 14 on the mobile device, even when the security module includes a bearer independent protocol (BIP) interface. Stated differently, even though secure services may be stored and executed in the conventional security module, the conventional security module is only enabled for secure communications with a trusted service manager.

Two conventional models of the conventional provisioning and security-card-based communications systems are currently in use.

FIG. 2A illustrates the conventional provisioning and security-card-based communication of FIG. 1 in a multiple service provider trusted service manager approach 10b. In FIG. 2A, three service providers are illustrated: a banking service provider 32a, a government service provider 32b, and a retail service provider 32c, and each of the service providers has a dedicated SP-TSM 26a-26c. In this delegated management approach, all of the SP-TSMs communicate through a central SEI-TSM 22a to a security module 14a associated with a mobile device 12a communicating on a wireless network operated by a particular mobile network operator (MNO) 20a. Implementation and maintenance of this architecture is very expensive for each of the service providers 32a-32c because each of the service providers 32a-32c must set up an SP-TSM 26a-26c expressly configured for secure communications through the SEI-TSM 22a, which is typically controlled by an MNO or a security card OEM. Often, this approach cannot be justified for smaller banks, utility service providers, retail establishments, and others.

FIG. 2B illustrates the conventional provisioning and security-card-based communication of FIG. 1 in a single service provider trusted service manager approach 10c. In the single SP-TSM approach, three service providers are illustrated: a transportation service provider 32d, an entertainment service provider 32e, and a commercial service provider 32f, and they all share the resources of a single SP-TSM 26d to communicate through an SEI-TSM 22b. The service providers pass secure communications on a carrier operated by an MNO 20b through a mobile device 12b to a particular security module 14b. In this approach, service providers 32d-32f and the SEI-TSM 22b each compensate the SP-TSM 26d for the service it renders. Service providers 32d-32f do not directly approach or pass communications to the SEI-TSM 22b due to current architecture limitations and the complexity of exchanging keys and other information with the SEI-TSM 22b.

In the multiple service provider trusted service manager approach 10b, every service provider owns or otherwise controls a dedicated TSM. Currently, it is generally recognized that some very large service providers prefer this approach because even though it is expensive (e.g., bringing an SP-TSM 26a-26c online may cost $1 million or more), the large service provider can distinguish itself from its much smaller competitors who cannot afford or justify the investment. For example, even though there are more than 2000 chartered banks in the United States, only a very few of the largest banks have built and control a dedicated SP-TSM 26a.

In the single service provider trusted service manager approach 10c, a single, centralized TSM negotiates relationships between individual service providers 26d-26f and an issuer of the security modules (SEI-TSM). The negotiation facilitates cooperative technical arrangements such that software applications and security protocols (e.g., key rotation, diversity, and the like) of the service provider cooperate with corresponding applications and protocols of the security module. In these cases, a plurality of service providers may all contribute or otherwise invest in a consortium to create and maintain the central SP-TSM.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

Mobile devices and remote computing servers can exchange secure data using techniques that reduce or eliminate communication through computing servers administered by mobile network operators (MNOs). For example, one embodiment is related to a method of communication between a mobile device and a service provider. The method includes an act defining at least one security area of memory in a security module, and an application signature is stored in the at least one security area. A set of rules is used to define access to certain attributes in the at least one security area wherein the attributes may include secure memory storage, processing functions, and the like. Subsequently, the computing server of a remote service provider is communicatively coupled to the mobile device. The computing server sends a request to pass secure data between the mobile device and the remote service provider computing server. The application signature is retrieved from the at least one security area and verified against an application signature received from the computing server. Once verified, the secure data is communicated between the remote service provider computing server and the mobile device. The security module on the mobile device is the only device that can encrypt and decrypt the communications. The security module, via the verified application signature, only communicates the secure data through the security application on the mobile device that was used to create the verified application signature.

In some embodiments, a security module has an assigned unique electronic identifier. The security module has a communication interface, a non-volatile memory, and a processing unit coupled to the communication interface and the non-volatile memory. One or more unassigned secure domains are formed in the non-volatile memory, and each of the unassigned secure domains has an assigned unique application identifier (AID). Each of the unassigned secure domains is accessible via a respective first security value, and using the respective first security value, each of the unassigned secure domains can be assigned to a service provider before or after the security module is deployed.

In a first embodiment, a security module has assigned thereto a unique electronic identifier (EID). The security module may include a communication interface, a non-volatile memory having configured therein a plurality of unassigned secure domains, each of the unassigned secure domains having assigned thereto a unique application identifier (AID), each of the unassigned secure domains accessible via a respective first security value, and a processing unit coupled to the communication interface and the non-volatile memory. In these and in other embodiments of the security module, each respective first security value of each of the unassigned secure domains is different from each other first security value, and in some cases, each first security value is associated with the AID of the respective unassigned secure domain.

In some cases, the non-volatile memory is further configured to include functional logic to provision each of the unassigned secure domains with at least one second security value. In some cases, an issuer-controlled secure domain is permitted to read and write data to a first secure domain of the plurality of unassigned secure domains, and the issuer-controlled secure domain is restricted from reading and writing data to at least some portion of the first secure domain after the first secure domain is assigned to a service provider. Each first security value is a security value associated with a public key infrastructure (PKI). At least one unassigned secure domain of the plurality of unassigned secure domains is assignable to a service provider after the security module is deployed. In some cases, the communication interface of the security module conforms to a near field communication (NFC) protocol. In some cases, the security module is a universal integrated circuit card (UICC), and in other cases, the security module is a subscriber identity module (SIM).

In a second embodiment, a system includes a plurality of security modules and each of the plurality of security modules includes a communication interface, a non-volatile memory, and a processing unit coupled to the communication interface and the non-volatile memory. The system also includes at least one computing server and at least one database associated with the at least one computing server.

With respect to the plurality of security modules, each security module has configured therein a unique electronic identifier (EID) associated with the respective security module and a plurality of unassigned secure domains. Each of the unassigned secure domains has assigned thereto a unique application identifier (AID). Each of the unassigned secure domains is accessible via a respective first security value. Each security module also has configured therein an issuer-controlled secure domain and functional logic to provision each of the unassigned secure domains with at least one second security value.

The database or databases in the system are arranged to store the plurality of first security values, and the at least one computing server is arranged to assign a selected secure domain of the plurality of unassigned secure domains of a selected security module of the plurality of security modules to a service provider. The assignment is performed by passing a selected first security value of the plurality of first security values to the service provider. The selected first security value corresponds to the respective first security value of the selected secure domain of the selected security module.

In some cases, the service provider is configured to generate a second security value, the second security value stored in the selected security module. In some cases, a security application executing on the mobile device is configured to read data or write data to memory of the selected secure domain of the selected security module by associating the data with the generated second security value.

In the system, the selected security module is associated with a mobile device, and the service provider may be a remote computing server. When this is the case, communications between the remote computing server and the mobile device may conform to a secure hypertext transport protocol (HTTPS).

In a third embodiment, a method provisions a security module that has a memory. The memory of the security module has configured therein a plurality of unassigned secure domains, and each of the unassigned secure domains is accessible via a respective first security value. The method may include the acts of executing a security application on a mobile device associated with the security module, establishing a secure communication connection between the mobile device and a service provider computing server, and receiving data encrypted with a first security value and an identifier of a selected secure domain of the plurality of unassigned secure domains from the service provider computing server, wherein the data encrypted with the first security value includes a second security value and a secure domain application. The method may also include the act of delivering the data encrypted with the first security value and the identifier of the selected secure domain to the security module and the first security value corresponding to a security value stored in the selected secure domain. The method may further include the acts of receiving data encrypted with the second security value from the service provider computing server, and delivering the data encrypted with the second security value and the secure domain application to the selected secure domain.

In some cases, the method also includes the act of decrypting the encrypted data with the secure domain application.

In some cases, when the method is executed, the first security value is based on an application identifier (AID) assigned to the selected secure domain and an electronic identifier (EID) assigned to the security module. In some cases, when the method is executed, communications between the service provider computing server and the mobile device conform to a secure hypertext transport protocol (HTTPS). The security application in some cases is a mobile payment security application.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

The conventional system to pass secret data between a mobile device and a remote server is complex. The communications require a key-exchange process that constantly demands cooperation from multiple computing devices administered by service providers, trusted service managers, and others. As smart phone capabilities continue to grow, the number of keys and key-transactions between the devices, mobile network operators, and other remote computing devices will also need to grow. Today, the key-processes are necessary for a smart phone hosting multiple applications, and the number of applications to administer is expected to grow into dozens and even hundreds of applications.

The inventors recognized the complexity and future growth in mobile payment systems, and the inventors set out to simplify the conventional systems. First, the inventors studied the conventional systems in detail from the capabilities and expectations of a security module.

Figure 3:
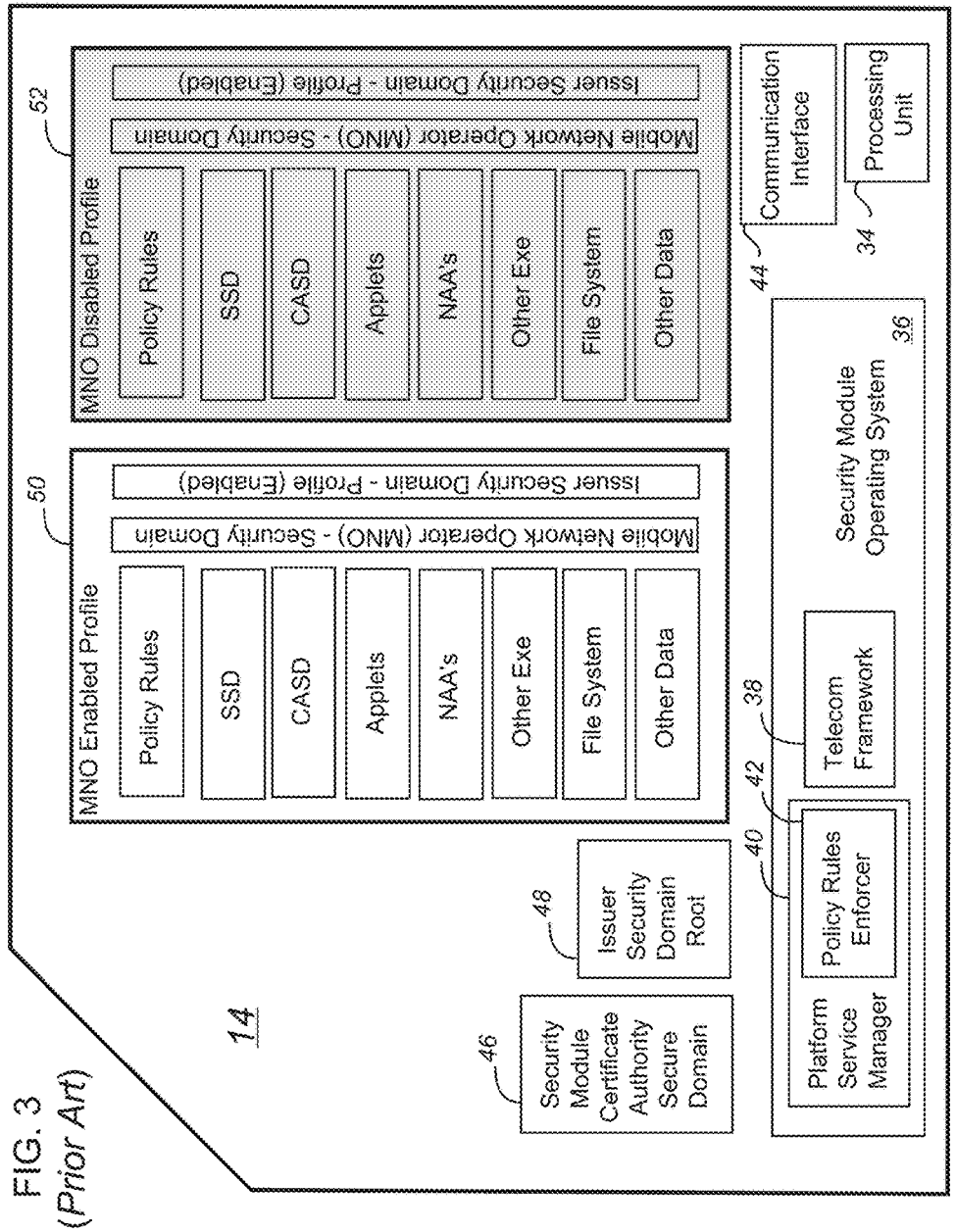
FIG. 3 is a conventional, provisioned security module embodiment.

FIG. 3 is a conventional, provisioned security module 14 embodiment in more detail. The security module 14 is formed by an original equipment manufacturer (OEM) having at least some fundamental logic which will include a processing unit 34, memory (not individually called out), and one or more certain sets of software instructions executable by the processing unit 34. In the security module 14 of FIG. 3, for example, the OEM formed the security module 14 having a security module operating system 36. The logic of the security module operating system 36 includes operative software and circuitry of a telecom framework 38 and a platform service manager 40, which itself includes a policy rules enforcer 42. The circuitry associated with the security module operating system may include various interfaces of the security module 14 to read and write from memory, transceivers for wired and wireless communication with computing devices external to the security module 14, power supply components, and the like.

The telecom framework 38 is a service of the security module operating system 36 that includes network authentication algorithms and other network infrastructure to facilitate the loading and operation of mobile network-specific features onto the security module 14. The platform service manager 40 is a service of the security module operating system 36 that ensures the basic security operations of the security module 14. For example, the platform service manager 40 may include anti-hacking features, device rooting-detection features, security card tampering detection features and the like. The platform service manager 40 may also ensure the basic formatting for data packets and communication into and from the security module 14.

The security module 14 also includes a communication interface 44. The communication interface 44 may include near field communication (NFC) circuitry and software, Bluetooth circuitry and software, Wi-Fi (e.g., IEEE 802.11) circuitry and software, or wireless communication logic that conforms to a different protocol. In addition, or in the alternative, the communication interface 44 of the security module 14 may include a standardized wired interface as defined, for example, in the ETSI TS 102 221 technical specification entitled Smart Cards; UICC-Terminal Interface; Physical and Logical Characteristics, or some other standardized interface, which is included herein by reference.

In the memory of the security module 14, the OEM or an issuer of the security module 14 will implement a security module certificate authority secure domain 46. Once implemented, the integrity of the security module certificate authority secure domain 46 is monitored and maintained by the platform service manager 40. The security module certificate authority secure domain 46 cannot be altered or deleted without destroying the integrity of the security module 14. In this way, the security module 14 may include certain one-time programmable features, fused features, or the like to facilitate the operations of the platform service manager 40. Another way that the integrity is facilitated is via a non-modifiable private security key, a certificate from an associated certificate authority, root public keys, and other key sets to facilitate key/certificate renewal. The security module certificate authority secure domain 46 facilitates the passage of secure information, including key exchange and rotation features, to and from the security module 14. The security module certificate authority secure domain 46 also facilitates the loading, unloading, and authorization of certificates that are passed between and received from an external certificate authority.

Also in the memory of the security module 14, the OEM or an issuer of the security module 14 will implement an issuer security domain root 48. The issuer security domain root is includes special features similar to those of the security module certificate authority secure domain 46. Particularly, the issuer security domain root 48 is monitored such that unauthorized alteration or deletion will destroy the integrity of the security module 14. The issuer security domain root 48 facilitates the passage of secure information, including key exchange and rotation features, for an issuer of the security module 14.

Two profiles are illustrated as stored in the memory of the security module 14 in FIG. 3. A first MNO profile 50 is enabled, and a second MNO profile 52 is disabled. The MNO profiles are created by the security module manufacturer, at a personalization facility, or by another entity after the security module 14 has left the manufacturer. The MNO profiles are created when the security module 14 is provisioned in the field. Generally speaking, provisioning the security module 14 includes the allocation of memory in the security card through the security module operating system 36 and platform service manager 40 as directed by a cooperative arrangement that involves an issuer of the security module 14, a mobile network operator, and one or more trusted service managers, in addition to optional certificate authorities, optional interoperability facilitators, and other entities. As illustrated, the first MNO profile 50 includes executable software instructions and data organized as a series of modules. An issuer security domain profile is formed to enable provisioning of the first MNO profile 50 in a way that permits and enforces certain memory boundaries for the MNO. Via the tools and services of the issuer security domain profile, the issuer of the security module 114 creates a mobile network operator (MNO) security domain.

The MNO security domain includes tools to manage the memory space provided in the first MNO profile 50. The MNO security domain creates, at the direction of the MNO, a policy rules module, a supplemental security domain (SSD), a controlling authority security domain (CASD), one or more applets that provide desired functionality of the service provider, network access applications (NAAs) to interface between service provider tools and MNO tools, along with other optional executable functions, a file system, and any other optional data.

The second MNO profile 52 is formed in the memory of the security module 14 along the lines of the first MNO profile 50. In FIG. 3, the first MNO profile 50 is enabled, while the second MNO profile 52 is disabled. In this respect, the functions of the first MNO profile 50 are accessible for use, and the functions of the second MNO profile 52 are maintained, but inaccessible.

After studying the conventional systems in detail from the perspective of a security module, the inventors identified many shortcomings of the conventional systems.

The inventors recognized the complexity and future growth in mobile payment systems and set out to simplify the conventional systems. A number of objectives were set out to minimize the complexity of the key exchange process that facilitates provisioning and transfer of secure data between a mobile device and a service provider. It was recognized that removing the transaction-by-transaction reliance on the trusted service manager (TSM) infrastructure would improve the efficiency of secure data transfer and reduce the cost of entry for both large and small service providers. In addition, it was recognized that the removal of the TSM infrastructure could not reduce security, and additional benefits would be received if security could be enhanced with the implementation of proven secure communication technologies and now existing infrastructure.

Another objective sought by the inventors was to develop a solution that enables a mechanism through which issuers and service providers can deploy new services to end-users after a security module is already issued and provisioned. If these objectives could be met, it was recognized by the inventors that new service providers could also be introduced with new applications after the security module is issued and provisioned.

In order to move away from the expensive TSM infrastructure, the functionalities of both the SEI-TSM and the SP-TSM are simplified. The securitization of data (e.g., encryption) is leveraged on the existing service provider server, and instead of securing data using certificates for secure hypertext transport protocol (i.e., HTTPS) based clients, security values such as keys are used to deliver the data to a client stored in the security module. Where an SP-TSM previously formatted data into application protocol data unit (APDU) commands, the formatting of data into APDU commands is now moved into an application associated with a secure domain formed on the security module. The security of the application is through a root of trust established when the application is loaded and associated with a particular secure domain. In addition to forming APDU commands, the secure application also communicates with other features of the security module and acts as a communication dispatcher between a service provider computing server and the security module.

The features now described are implemented based on a new infrastructure created by a manufacturer of the security module. In the new infrastructure, a one, two, or a plurality of unassigned secure domains are created in the memory of the security module. The manufacturer of the security module assigns a unique application identifier (AID) to each of the pre-created, unassigned secure domains according to known practices, and the manufacturer creates a security value (e.g., a security key) that is used to access the respective secure domain. In some cases, the AID of the pre-created, unassigned secure domain is used to create the security value used to access that particular secure domain. By using this architecture, applications that require secure data transfer can be loaded during manufacture, after manufacturer, and after provision and deployment in the field.

This new architecture provides benefits to security module manufacturers, MNOs, service providers, and end-users. For example, a security module manufacturer can sell innovative security modules, and the manufacturer administers the security values used to access the unassigned secure domains. In this way, the manufacturer is able to sell or rent access to the secure domains to service providers, and the service providers can deploy new secure data communication features without the significant financial investment required in the conventional technology. In this approach, individual security values can be provided to individual providers, and the security values, each of which grants access to a different, unassigned secure domain, can be transferred at any time. As another alternative, issuers of the security modules will receive access to the security values that enable use of the unassigned secure domains.

Figure 4:
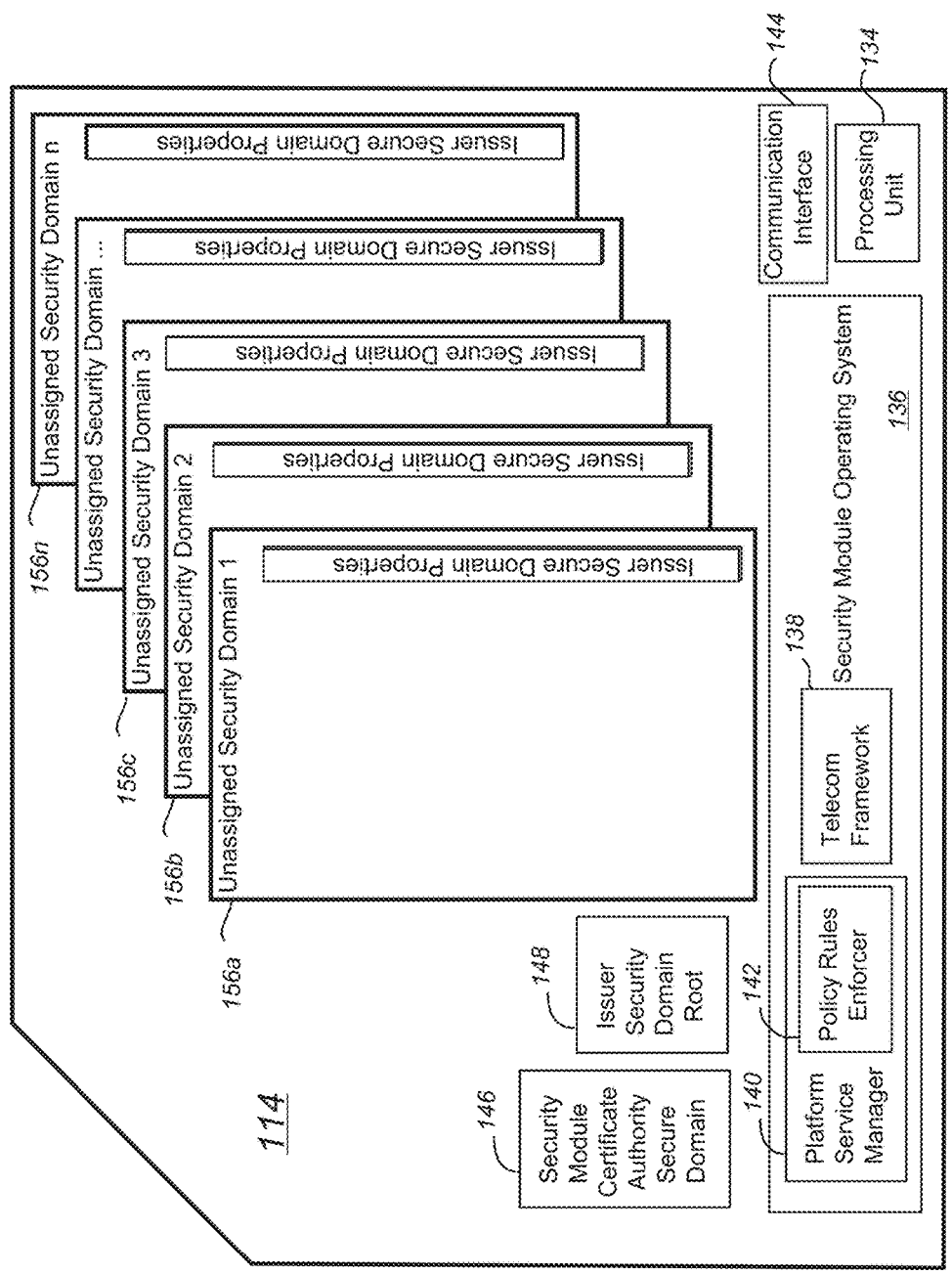
FIG. 4 is an improved security module embodiment.

FIG. 4 is an improved security module embodiment 114. The security module 114 of FIG. 4 bears substantial similarity to the conventional security module 14 of FIG. 3. In areas where the logic of the improved security module 114 is the same or nearly the same as the logic of the conventional security module 14, the discussion of the logic will be limited or absent for brevity.

Security module 114 includes a processing unit 134 and a security module operating system 136. The logic of the security module operating system 136 includes a telecom framework 138, and a platform service manager 140 that includes a policy rules enforcer 142. Security module 114 also includes a communication interface 144, a security module certificate authority secure domain 146 module, and an issuer-controlled security domain root 148 module.

The manufacturer of security module 114 also creates one or more unassigned secure domains 156*a*, 156*b*, 156*c*, 156*n*. Where a plurality of secure domains are created, the manufacturer may create 2, 5, 10, 100, or some other number of unassigned secure domains. In each security module 114, the manufacturer will store a permanent electronic ID (EID). In addition, the manufacturer will also create a permanent application ID (AID) for each unassigned secure domain formed on the security module 114.

Secure domains may be used to provide secure storage for secure values such as cryptographic keys. The secure domain also provides access to the secure information via one or more standardized protocols as known to one of skill in the art. For example, in some cases, access to information in the secure domain may be made available to off-card entities using GlobalPlatform (GP) secure channel protocol such as defined in the GlobalPlatform Card Specification v.2.2.1, which is incorporated herein by reference.

The properties of secure domains may be configured via GP privileges (e.g., Delegated or Authorised Management, DAP Verification, Token Management, Global Delete), by the Provisioning of keys (e.g., for SCP02/03 or SCP80/81), and by associating a first secure domain to another secure domain with other rights, by associating a secure domain to itself (and thus removing all management rights of a superior secure domain (i.e., extradition), or by assigning memory quotas for the secure domain and all its contents.

In earlier versions, the Issuer Secure Domain (ISD) had several unique privileges. However, in the latest GlobalPlatform Card Specification, the secure domain is also configured via privileges, and except for being there in the beginning, no major specific feature remains. This set of procedures to extradite a security domain should allow MNOs to retain the same benefits as they have today with a current ISD in a security module.

The security module 114 is a device that provides a new and better method of communicating secure information between a remote computing server and a mobile communications device (e.g., a smart phone). The conceived solution substantially removes the need for key exchanges, key diversification, pre-shared key (PSK) concepts, and trusted service managers (TSMs).

In some embodiments, the mobile network operator (MNO) controls information on the subscriber identity module (SIM) or other security module of a mobile device. The information stored in the security module is used by the MNO to identify the mobile device and administer contracted mobile network services to benefit a user of the mobile device.

In these embodiments, the MNO "rents" memory space, processor cycles, and in addition or in the alternative, functionality in a security module 114 that is coupled to one or more mobile devices. The rent may include monthly payments, yearly payments, subsidized payments, or some other form of value in exchange for access to hardware, software, or hardware and software attributes of the security module 114. In this way, the information stored in the security module 114, which is specifically coupled with one or more applications executing or executable on a remote computing server, can be used to facilitate secure communication between the remote computing server and the attributes of security module 114. In these embodiments, the complexity of the conventional system is reduced while security is maintained and in some cases enhanced.

As used herein, the attributes of the security module may include a computer readable medium such as transitory memory (e.g., random access memory (RAM)), non-transitory memory (e.g., read-only memory (ROM) such as FLASH memory), an entire processing unit, shared or dedicated resources of a processing unit, one or more software applications, combinatorial logic, arithmetic units, algorithmic units, encryption engines, decryption engines, random number generators, power supply circuitry, communications circuitry, and other hardware, software, and combined hardware and software logic modules that form the security module.

One aspect of the embodiments described herein eliminates the transfer of information through some portion of the mobile network operator's infrastructure. In particular, rather than passing each packet of information through one or more designated computing servers operated by the MNO, a secure communication path can be established directly between the security module 114 of the mobile device and the remote server. The secure communication path may be associated with Transport Layer Security (TLS), Secure Sockets Layer (SSL), secure hypertext protocol (HTTPS) communication, secure element (SE) access control documents (e.g., access control rules files (ACRF) available to mobile devices), public key infrastructure (PKI), and other non-limiting mechanisms and techniques used to securely communicate data between the remote server and the mobile device. The direct path between the security module of the mobile device and remote servers reduces complexity with key exchange, diversification, and other conventional techniques.

Figure 1:
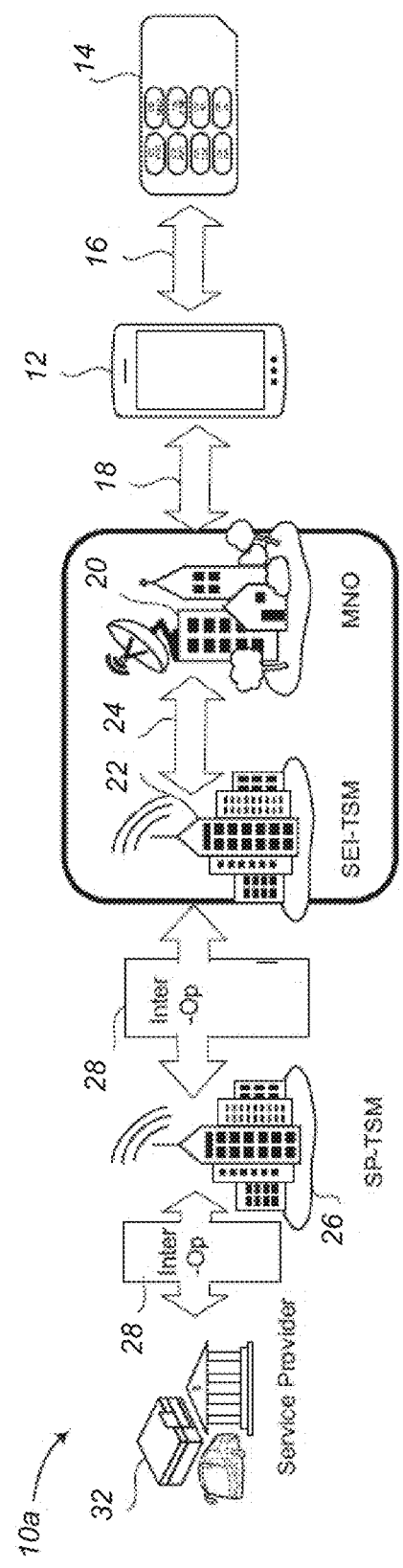
FIG. 1 illustrates conventional provisioning and security-card-based communication of secure data through a mobile network.
Figure 2:
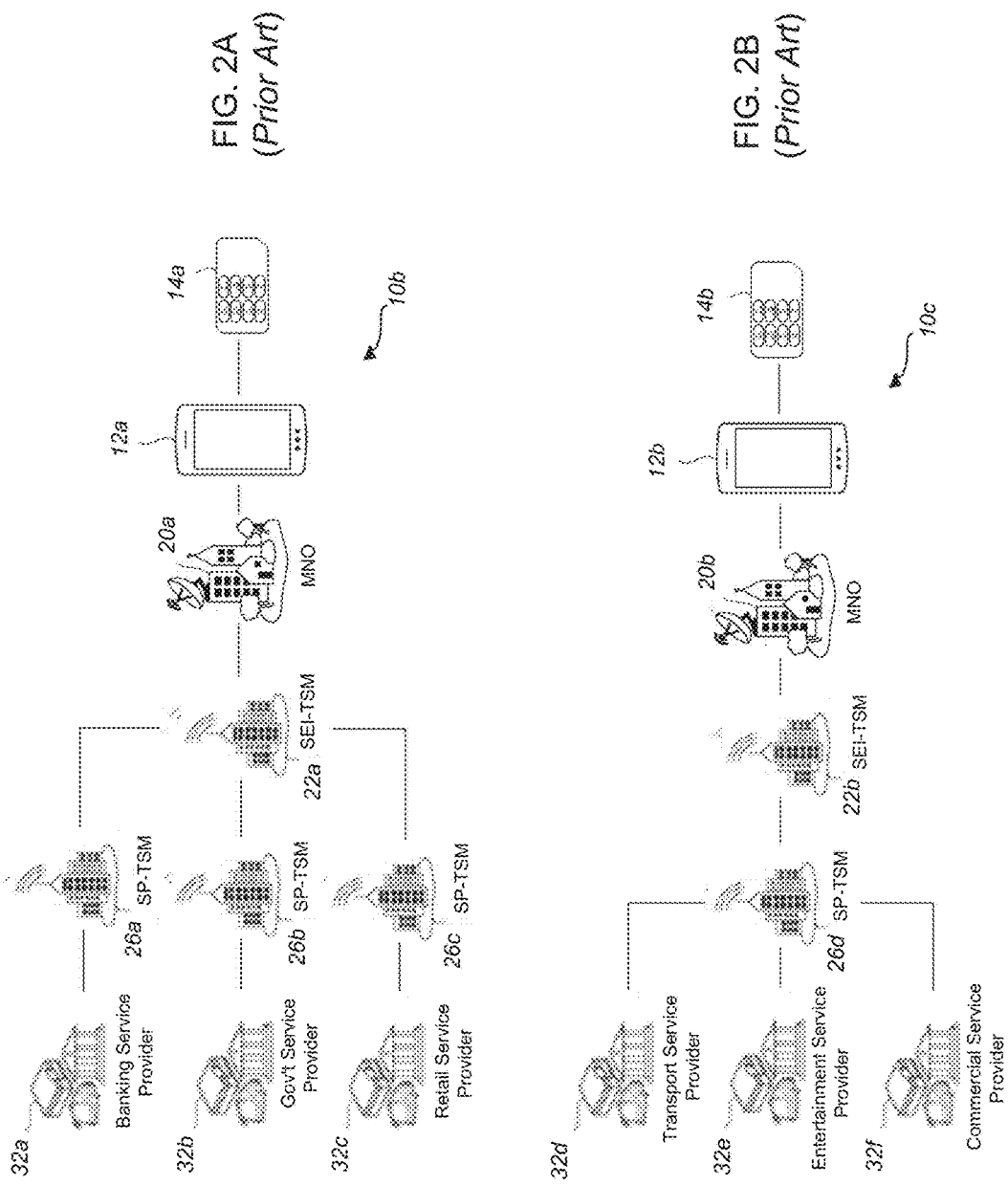
FIG. 2A illustrates the conventional provisioning and security-card-based communication of FIG. 1 in a multiple service provider trusted service manager approach.
FIG. 2B illustrates the conventional provisioning and security-card-based communication of FIG. 1 in a single service provider trusted service manager approach.
Figure 5:
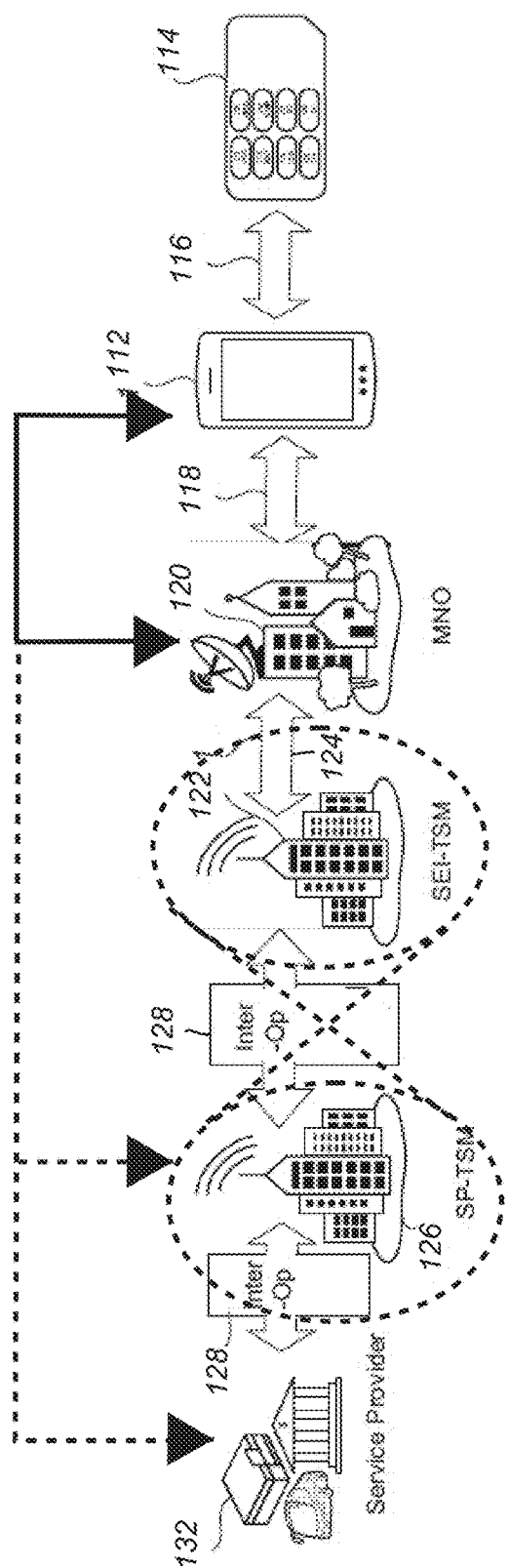
FIG. 5 illustrates a combination of conventional provisioning and security-card-based communication of secure data through a mobile network as represented in of FIG. 1, along with embodiments of the new secure infrastructure described herein.

FIG. 5 illustrates a combination of conventional provisioning and security-card-based communication of secure data through a mobile network as represented in 10a of FIG. 1, along with embodiments of the new secure infrastructure described herein. In the figure, a secure communications infrastructure includes a security module 114 such as a SIM card coupled to a mobile device 112 such as a smart phone. The mobile device 112 has a direct, local communicative relationship 116 with the security module 114. The communications may occur via a single wire protocol (SWP) bus, an I2C bus, serial peripheral interface (SPI) bus, or some other communication path and protocol.

The mobile device 112 in FIG. 5 is able to communicate with a mobile network operator (MNO) 120 that provides the wireless mobile network services 118 such as voice calling, data communications, text messages, and the like. The MNO 120 is closely aligned with data in the security module 114, and most often, the MNO 120 provisions the initial data into the security module 114. When the mobile device 112 accesses services 118 provided by the MNO 120, information from the security module 114 is passed to the MNO 120.

A secure element issuer-trusted service manager 122 (SEI-TSM) provides cryptographic tools and data 124 such as public and private keys and encryption/decryption algorithms to the MNO 120 and other entities, some of which are associated with the MNO 120. A second trusted service manager coupled with a service provider 126 (SP-TSM) is separated from the SEI-TS 122 by an optional interoperability facilitator 128. The interoperability facilitator 128 permits the sharing of disparate data structures, protocols, and the like between trusted service managers and other computing devices. The SP-TSM 126 is coupled through a same or different interoperability facilitator 128 to one or more service providers 132.

A service provider may charge for goods and services as illustrated by the service provider 132 of FIG. 5, which covers banking services, shopping services, transportation services, government services, utility services, and other goods and services (not shown). In the conventional operation of FIG. 1, when a service provider 32 communicates with a mobile device 12, all of the communications pass through the SP-TSM 26, the interoperability mechanism 28, the SEI-TSM 22, and certain computing servers of the mobile network operator (MNO) 20. The communication path is secure, but complex, and in some cases, the communication path is also slow.

Conversely, in FIG. 5, a direct communication path between the mobile device 112 and the service provider 132 is provided. Another communication path may in some embodiments also include the service provider trusted service manager (SP-TSM) 126. By introducing additional, more direct communication paths enabled in a security module 114, the embodiments described herein provide robust end-to-end security with reduced complexity.

As also optionally indicated by the dotted lines, an SP-TSM 126 may continue to facilitate communications through an interoperability facilitator to an SEI-TSM 122. The service providers 132 may continue to include communicative secure operations with the SP-TSM 126, and the MNO 120 may continue to include communicative secure operations 124 with the SEI-TSM 122.

Figure 6:
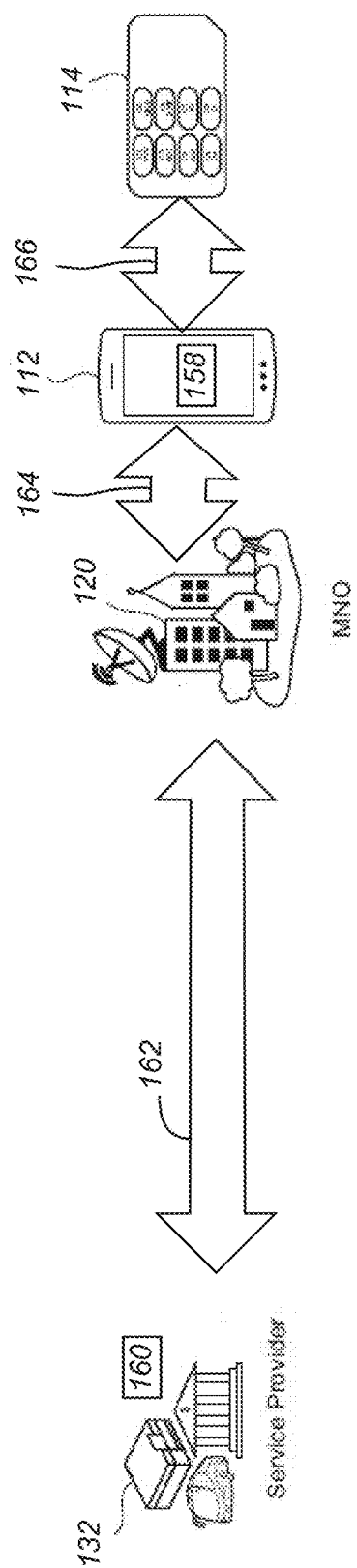
FIG. 6 illustrates a secure communication path embodiment between a mobile device and a service provider.

FIG. 6 illustrates a secure communication path embodiment between a mobile device 112 and a service provider 114. The embodiment of FIG. 6 represents the direct communication path between the mobile device and the service provider in FIG. 5, as well as aspects of the communication path that also includes an SP-TSM 126.

In FIG. 6, a security application 158 resides on the mobile device 112. The security application 158 on the mobile device 112 manages a secure connection with a remote computing server 160 associated with the service provider 132. The secure connection includes one or more certificate-exchange acts using HTTPS protocols, SSL layers, or other techniques. The packets of data sent by the remote computing server 160 to the security module 114 are identified by the security application 158 running on the mobile device 112.

In the conventional architecture a computing server associated with the service provider would pass data to a service provider trusted service manager (SP-TSM). The SP-TSM would encrypt the data and create application programming data unit (APDU) commands from the data. The SP-TSM would then securely communicate the APDU commands through an SEI-TSM controlled by the MNO for ultimate passage to the mobile device. The mobile device would decrypt or otherwise unpack the APDU commands and pass them to a security module for processing. In the new infrastructure, a security application running on the remote computing server 160 sends packets directly to the security application 158 running on the mobile device 112 over a secure Internet-based communication path comprising first, second, and third communication paths 162, 164, 166. The remote computing server 160 and the mobile device 112 can communicate using a shared key infrastructure. Embedded within the packetized data sent by the remote computing server, secret data is also encrypted with a shared key architecture known by a secure domain inside the security module 114. The security application 158 running on the mobile device forms the encrypted data from the remote computing server 160 into APDU commands and passes the APDU commands to the security module.

After the packets of data are received by the security application 158, the security application 158 uses a public key infrastructure (PKI) to encapsulate the data. Then, with support from the MNO 120, the security application 158 conforms the data for passage to the security module 114. Preparing the data for passage to the security model may include, for example, applying rules in the Global Platform Card Specification Version 2.2.1, which is included herein by reference, or a like protocol definition, along with Access Rules conditions defined by the protocol that governs mobile security operations in the mobile device 112. The security module 114 receives the data and decrypts the data, which was encrypted using a public key infrastructure.

The security application 158 may optionally carry a certificate from a certificate authority, trusted services manager, or other entity. The certificate verifies with acceptable assurance the validity of the security module operations.

In one embodiment, the security application 158 on the mobile device 112 will perform an initial check and ongoing checks to verify that the mobile device has not been rooted. A rooted mobile device pierces a security veil that an MNO 120 has on the mobile device 112 to provide security. That is, once rooted, a user of the mobile device 112 gains access to memory areas, functions, and other features of the mobile device 112 that are not otherwise accessible. If the mobile device 112 is rooted, the operation of the security application 158 terminates.

After the verification, which is successful, the security application 158 will extract a public key of the mobile device 112. The public key, which may be stored in an area of memory in the mobile device 112, is exchanged with the security module 114. The security module 114 may also pass a public key to the mobile device 112. Using the public key, the security module 114 then verifies the integrity of the security application 158 executing on the mobile device 112, for example by passage of a certificate. Once the certificate is verified, communications with the security module 114 thereafter pass only through the security application 158, and the security application administers all interactions with the security module.

Based on the access rules defined for the security application 158, the security application 158 can access certain attributes of the security module 114 such as memory, files, certain operations, and the like.

Using the structures and techniques described herein, an MNO 120 can offer to rent access to secure domains defined on the security module. Service providers 132 favor such a relationship because it provides a mechanism for secure, efficient communications with the mobile device 112 while avoiding the expensive conventional infrastructure.

In one embodiment, the manufacturer creates one or more areas of the security module 114 that will be made accessible to third party service providers 132 such as banking institutions, goods or services vendors, and the like. In these cases, a servicing entity, which may be the manufacturer, the security module 114 issuer, the MNO, or some other entity, administers access and use of these unassigned secure domains. When the MNO 120 or other servicing entity and a service provider 132 reach agreement on terms of the relationship, the conditions to access one or more of the secure areas are defined in the access control rules file (ACRF), and the conditions and storage area are associated with an application signature that is also stored in the security module 114.

After the mobile device 112 is in operation, an application executing on a remote computing server and bearing the correct signature may be used to directly access secure information stored on the security module 114 of the mobile device 112.

In FIG. 6, three communication paths are illustrated. A first communication path 162 represents communication between a remote computing server 160 of a service provider 132 and a wireless network operator 120. A second communication path 164 represents communication between a wireless network operator 120 and the mobile device 112. A third communication path 166 represents communication between a mobile device 112 and a security module 114 associated with the mobile device 112.

Communications on the first and second communication paths 162, 164 between the remote computing server 160 and the mobile device 112 through the MNO 120 may comport with an Internet-based security protocol such as secure hypertext transport protocol (i.e., HTTPS), secure socket layer protocols (e.g., SSL7), transport layer protocols (TLS), and the like. Communications on the third communication path 166 between the mobile device 112 and the security module 114 may be passed via a single wire interface (SWI), an I2C serial bus, or some other wired or wireless communicative conduit.

The communication paths 162, 164, 166, illustrated in FIG. 6 and the secure domains 156a-156n (FIG. 4), once assigned, may conform to a particular access rules file (ARF), a particular access control conditional file (ACCF), or some other rules architecture defined in a specification such as the GlobalPlatform Device Technology Secure Element Access Control specification, which is included herein by reference. The communications may also leverage Access Rule Application Master (ARA-M) and Access Rule Application Client (ARA-C) architectures defined in similar specifications. These infrastructures, along with proven technologies such as PKI infrastructure can be implemented on both the remote computing server 160 (for encryption) and on the security module 114 (for authentication) to provide secure communications.

Figure 7:
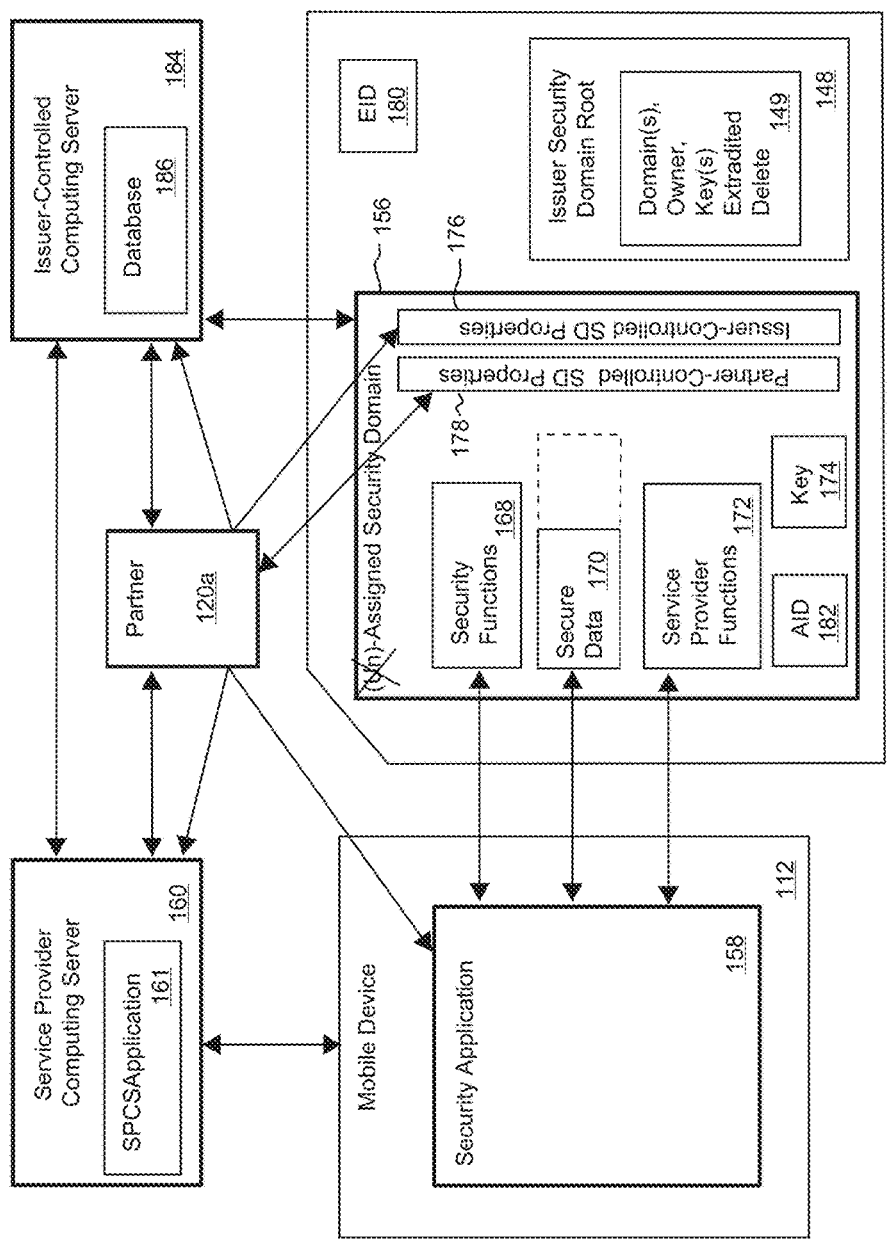
FIG. 7 illustrates another embodiment of communications associated with a client accessible secure area in a mobile device security module.

FIG. 7 illustrates another embodiment of communications associated with a client accessible secure area in a mobile device security module. In FIG. 7, certain portions of security module 114 are illustrated while other portions are left absent for simplicity of the drawing. The security module 114 includes an assigned secure domain 156. The secure domain 156 was formerly an unassigned secure domain 156a-156n (FIG. 4), but the secure domain 156 has been provisioned by an issuer-controlled computing server 184, which also includes a database 186 to manage the provisioning of any number of secure domains 156a-156n.

The provisioning has been instituted after the security module 114 has been deployed in the field. In the embodiment of FIG. 7, a particular service provider 132 (FIG. 6) has been granted the privilege of using the secure domain. The privilege may be granted based on a purchase, a rent, or by some other means. The privilege may be provided through the issuer-controlled computing server 184, which may be controlled by a manufacturer of the security module 114, and MNO, or some other entity or plurality of entities.

The security module manufacturer determines which entity or entities will assign the unassigned secure domains 156a-156n. One way that the security module manufacturer grants control to the unassigned secure domains 156a-156n is by providing security values (e.g., encryption keys) that correspond to the unassigned secure domains 156a-156n. In some cases one first security value is associated with each unassigned secure domain, but in other cases, a first security value may be associated with a plurality of unassigned secure domains 156a-156n. The first security values are used cooperatively with issuer-controlled secure domain properties 176 that are located in the unassigned secure domain 156a-156n memory by the manufacturer.

The issuer-controlled secure domain properties 176 may include data, executable functions, memory structures, a time or date stamp, a history record, and any other such information or functional logic desirable located by the manufacturer. In some cases, the issuer-controlled secure domain properties 176 may include only a single value such as a security key associated with the respective secure domain. By matching a particular security key with a corresponding secure domain 156a-156n, the secure domain can be provisioned.

In some cases, a security key that matches a particular secure domain 156a-156n is formed using an application identifier (AID) 182, which is programmed into the unassigned secure domain 156a-156n by the manufacturer of the security module 114. In some embodiments, the AID 182 conforms to a particular numbering system such as defined in ETSI TS 101 220, entitled Smart Cards; ETSI Numbering System For Telecommunication Application Providers, which is included herein by reference. In other embodiments, the security key that matches a particular secure domain 156a-156n is formed using the AID 182 and in addition, or in the alternative, a unique identifier EID 180 for the security module 114. In some embodiments, the EID 180 is an embedded universal integrated circuit card (eUICC) identifier, which is a globally unique identifier for the security module 114. In some cases, the format of the EID 180 is governed by the International Standards Organization (ISO), though in other cases, a different governing body provides information to determine and format the EID 180.

The assigned secure domain 156 is illustrated with a plurality of security functions 168, a secure data memory area 170, a service provider functions area 172, a service provider key area 174, the issuer-controlled secure domain properties 176 provided by the manufacturer of the security module 114, and optional partner-controlled secure domain properties 178. The optional partner-controlled secure domain properties 178 may be provided to permit hierarchical levels of control in a secure domain. For example, one service provider who has been granted access to the secure domain 156 may optionally further grant access to a portion of the secure domain to another service provider. In such a case, access to only a sub-portion of the secure domain for the sub-service provider may be implemented using the optional partner-controlled secure domain properties 178. Other modules in the secure domain memory, such as some or all of those illustrated in the conventional security module 114 of FIG. 3, are not shown for simplicity in the explanation of FIG. 7.

An issuer-controlled security domain root 148 is formed in the security module 114 by the manufacturer. The issuer-controlled security domain root 148 includes a domain management table 149. The domain management table is formed to manage assigned secure domains such as secure domain 156 and unassigned secure domains 156a-156n. For each secure domain, information representing the owner or controlling entity of secure domain may be stored; particular access keys may be stored; a status of the secure domain, such as whether the secure domain has been extradited, may be stored; and an indication of whether each particular secure domain has been enabled, disabled, or deleted may also be stored. Other information associated with the security module 114 or the individual secure domains may also be stored.

The extradited status stored in the domain management table 149 indicates whether or not the issuer security domain root 148 is able to read some or all of the memory area of a particular secure domain. When a secure domain is extradited, a service provider has been granted secure access to some or all of the memory in the secure domain. That is, the service provider may encrypt the data stored in the secure domain, and by way of the extradition process, neither the issuer-controlled computing server 184 nor any other outside entity is permitted to access the information in the assigned secure domain.

A mobile device 112 is represented in FIG. 7. A security application 158 is stored in a memory of the mobile device 112, and the processor executable software instructions of the security application 158 may be executed by a processing unit (not shown) to carry out the functions of the security application 158. The majority of logic found in a conventional mobile device is not illustrated in the mobile device 112 of FIG. 7 for simplicity in the explanation, but one of skill in the art would understand that such logic is included.

The security application 158 is arranged to bi-directionally communicate with a plurality of modules in the secure domain 156. In some cases, the security application 158 accesses security functions 168 and service provider functions 172. In some cases, the security application 158 is arranged to access (i.e., read/write), data in secure data area 170. The security application 158 is also arranged to bi-directionally communicate with a service provider computing server (SPCS) application 161. The communications with the SPCS application 161 may be direct communications, or the communications may include services provided by or through a partner 120a such as an MNO 120. In some cases, the SPCS application 161 also communicates with the issuer-controlled computing server 184.

The service provider computing server 160, which executes the SPCS application 161, communicates with the issuer-controlled computing server 184. In some cases the bi-directional communications between the service provider computing server 160 and the issuer-controlled computing server 184 are direct; in other cases, the communications are provided by or through partner 120a.

The partner 120a in FIG. 7 may optionally be included in many communications, in very few communications, or in no communications. It is understood that the mobile device 112 and the various servers communicate through a wide area network infrastructure administered by an MNO such as MNO 120 (FIG. 6). Accordingly, an MNO 120 may be arranged as partner 120a. In some cases, partner 120a may include multiple entities providing a plurality of different services within the system. Partner 120a may or may not provide services to implement, enhance, or otherwise affect secure communications between the mobile device 112 and the service provider computing server 160. The optional communication paths to and from partner 120a are illustrated in FIG. 7.

An embodiment to assign or otherwise provision an unassigned secure domain is now described. Prior to beginning the process, the manufacturer of security module 114 has created a plurality of unassigned secure domains 156a-156n (FIG. 4) in the memory of the security module 114. Each of the multiple secure domains 156a-156n has been created with an assigned AID and one or more corresponding security values (e.g., encryption keys). Each of the secure domains 156a-156n may be uniquely identified by a combination of the EID 180 and the AID 182, and these values, along with other optional values, may be combined and used to form an associated security value. Upon creation of the unassigned secure domains 156a-156n and the corresponding security values, the domain management table 149 may be created or otherwise updated.

In addition to the creation of a domain management table 149 on the security module 114, a database that is separate and distinct from the security module 114 is also updated with corresponding information. One such separate and distinct database that may be created, updated, and otherwise maintained is database 186 illustrated in association with the issuer-controlled computing server 184.

Database 186 will generally include the information identifying the security module 114 such as EID 180. The database 186 will also generally include information identifying each of the unassigned secure domains 156a-156n such as the AID 182 values that correspond to each of the unassigned secure domains 156a-156n. In order to access the unassigned secure domains 156a-156n, particular security values corresponding to each of the undersigned secure domains 156a-156n will also be stored in the database 186. In addition, other security values and identification information may also be stored in database 186 to enable the issuer-controlled computing server 184 to access and control the issuer-controlled secure domain properties 176 formed on the security module 114.

In some cases, other information is also stored in one or both of the domain management table 149 and the database 186. Such information may be used for the management and administration of the security module 114. Examples of such information include silicon-reference and batch numbers to segregate various versions, sizes of the secure domains created, other architectural information regarding the secure domains, timestamps, date stamps, manufacturing identifiers, and the like.

The manufacturer of the security module 114 may create the plurality of unassigned secure domains 156a-156n having a fixed size in memory such as 512 kilobytes (KB), 1 megabyte (MB), or some other larger or smaller size. The number of unassigned secure domains 156a-156n may be small (e.g., 1 or 2) or large (e.g., 10 or more). In some cases, a manufacturer makes different security modules with different numbers of unassigned secure domains 156a-156n. In some cases, a manufacturer makes different security modules with unassigned secure domains 156a-156n having different initial sizes. In still other cases, the manufacturer makes a security module with some unassigned secure domains 156a-156n having a first size and other unassigned secure domains 156a-156n having a second size, which is different from the first size. In some cases, the size of a particular secure domain may be changed before the secure domain is assigned or after the secure domain is assigned.

The process of assigning a secure domain to a service provider generally includes a key exchange with the particular service provider that will control the secure domain when it is assigned. In this case the issuer-controlled computing server 184 may be managed by the manufacturer of the security module 114, the partner 120a, or by some other entity. The initial communication may be instituted by the service provider computing server 160 or by the issuer-controlled computing server 184. The issuer-controlled computing server 184, with particular direction and cooperation of the service provider computing server 160, will load the secure domain 156 with appropriate applications, functions, data, security values, and the like. The communications between the service provider computing server 160 and the issuer-controlled computing server 184 are secure and may include any number of key exchange, key rotation, or other secure communications.

The process of loading information into the secure domain 156 may be carried out by the issuer-controlled computing server 184, the service provider computing server 160, or a combination of both servers. Some functions, such as executive or administrative functions to manage the secure domain 156, are naturally carried out by the issuer-controlled computing server 184. Other functions are cooperatively turned over and performed or otherwise managed by the issuer-controlled computing server 184. Alternatively, particularly when the information to be loaded into the secure domain 156 is particularly sensitive, such as key formation algorithms, algorithms, identity information, biometric information, secret processing, or other highly secure data, service provider computing server 160 will manage the task of loading the secure domain. In these cases, when the service provider computing server 160 is interacting with the assigned secure domain 156, the service provider will often rotate security values before the service provider applications and data are loaded in the assigned secure domain 156.

In some cases, after the secure domain 156 is loaded, the secure domain 156 is extradited. This extradition procedure operates to sever the ability of the issuer-controlled computing server 184 to access some or all of the memory in the assigned secure domain 156. Once the extradition process is complete, the issuer-controlled computing server 184 may retain certain abilities associated with the secure domain 156, but the issuer-controlled computing server 184 is not able to read or write data in certain areas or all areas of the secure domain 156.

One ability that may be retained by the issuer-controlled computing server 184 is the ability to revoke service provider access to the secure domain 156. This may occur based on particular contractual reasons between the entity that controls the security module and the service provider, or this may occur for other reasons. The issuer-controlled computing server 184 may be able to delete or otherwise obfuscate all of the information in the secure domain 156. In still other cases, the issuer-controlled computing server 184 may be able to change the size in memory (e.g., increase the size, decrease the size) of the secure domain 156.

In some cases, the issuer-controlled computing server 184 is able to create additional secure domains in available memory of the security module 114.

The security application 158 executing on the mobile device 112 provides services to interact with security functions 168 executing in the assigned secure domain 156. In some embodiments, the security functions 168 provide services that comply with an ARA-M definition. The security functions 168 provide for secure access into the secure domain 156 and for authentication of the security application 158 running on the mobile device 112. Based on the access rules defined for the security application 158, the security application 158 may be granted or denied particular access to functions and data stored in the secure domain 156. In this way, using the system of ARA-M rules, a partner 120a may be placed in control of the operations of the secure domain 156.

The security application 158 also provides services to interact with service provider functions 172 that execute within the secure domain 156. The service provider functions 172 are arranged to encrypt and decrypt secure data passed from the service provider computing server 160 and stored in the secure data area 170. The encryption and decryption operations are facilitated using shared security values such as encryption keys known to the service provider functions 172 and known to the service provider application running on the service provider computing server 160. The security values may be stored in a specific service provider key area 174 of the secure domain 156. In some embodiments, a first security value stored in the service provider key area 174 is known only to the application running on the service provider computing server 160 and the service provider functions 172 stored in the secure domain 156. In these or alternative embodiments, a second security value stored in the service provider key area 174 is known only to the security application 158 running on the mobile device 112 and the service provider functions 172 stored in the secure domain 156. By enabling particular encryption mechanisms, such as PKI, information can be securely communicated between the mobile device 112 and the secure domain 156 in the security module 114. In addition, the information that is securely communicated between the mobile device and the secure domain includes further encrypted data that is accessible only by the service provider functions 172 and the service provider computing server 160.

In some cases, additional secret information is also stored in the service provider key area 174. For example, in some cases, a secret personal identification number (PIN) can be stored in the service provider key area 174. The PIN can be used to authenticate the user to the security application 158 executing on the mobile device 112. Other techniques of authenticating the user to the security application 158 are also contemplated.

As illustrated in FIG. 7, various levels and types of communication pass between the security application 158 and the assigned secure domain 156. The communication may be enabled through proprietary protocols or other protocols known to one of skill in the art. In some embodiments, communication conforms to a particular set of application protocol interface (API) function calls. One example of such API is the OpenMobile 3.0 API, which is incorporated herein by reference. Other protocols and frameworks are contemplated.

The security application 158 executing on the mobile device 112 performs other functions. For example, the security application 158 may provide a number of security checks before interacting with the secure domain 156 or even before interacting with the security module 114. The security application 158 may provide a root-of-trust check, for example. The root-of-trust check may, for example verify software integrity of the mobile device 112. Such a procedure may include a check for a firmware signature during boot-up. In these cases a firmware signature is internally stored by known procedures. If the security application 158 detects any breach in security, the security application 158 may flag an error, may communicate an error or warning message, may terminate, or may take some other action.

In some cases, the service provider applies a digital signature to the security application 158. The digital signature may be verified by the security functions 168 or service provider functions 172 executing in the secure domain 156. In addition to a digital signature, or as an alternative, the security application 158 may carry a certificate from a certificate authority (e.g., VERISIGN). A valid certificate may be used to ensure the security of communications between the security application 158 in the application running on the service provider computing server 160. The digital signature, the valid certificate, and other additional or alternative information may be stored in the secure data area 170 of the secure domain 156.

In some cases, the security application 158 determines by known techniques whether or not the phone has been rooted. If the phone has been rooted, the security application 158 will not execute. In some cases, the detection of one error or another may be contained within the security application, and the security application is then suspended or terminated. In other cases, the detection of certain errors may also cause an indication to be passed to the secure domain 156. This indication, which may be a particular indication that the device either has been or may soon be compromised, may cause a security function 168 or service provider function 172 to take further steps to protect secure data 170. The further steps may include further encrypting data, obfuscating data, destroying data, or taking some other action.

Figure 8:
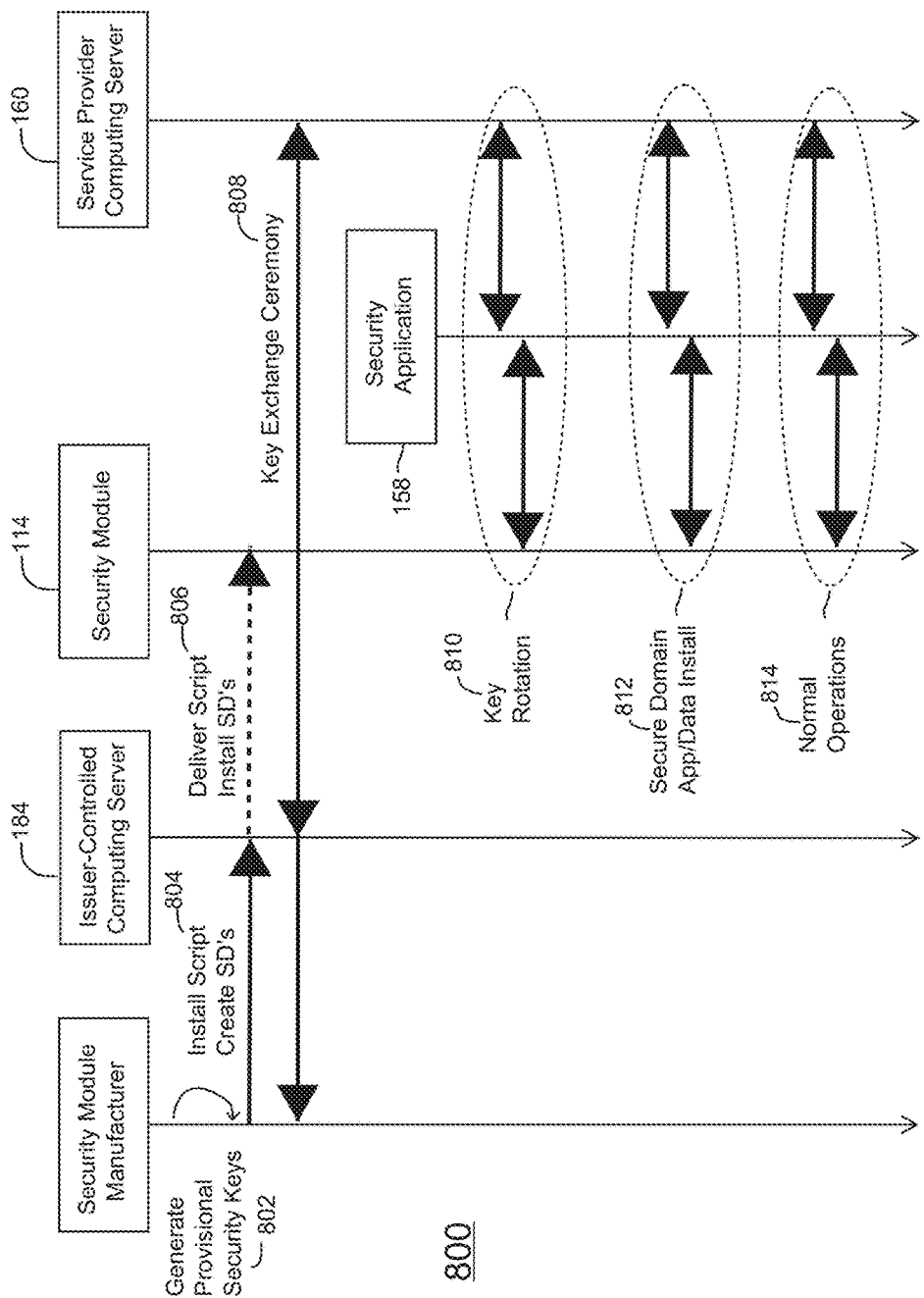
FIG. 8 is a programmatic data flow chart illustrating the creation of a new secure domain in a security module already deployed in the field.

FIG. 8 is a programmatic data flow chart illustrating the creation of a new secure domain in a security module already deployed in the field 800. At 802, a security module manufacturer designs a structure for a security module or receives such a design from a particular issuer of security modules. The security module manufacturer targets an electronic ID (EID) that will be used to uniquely identify the security module, and the security module manufacturer generates an application identifier AID for each unassigned secure domain that will be created in the security module. The security module manufacturer will also generate a plurality of security values to access the structures that will be formed in the security module. In some cases, such as with security values associated with unassigned secure domains, the security values are generated for provisional use. That is, at a time in the future when the unassigned secure domain is assigned to a particular service provider, the provisional security values are used to implement the provisioning, but the secure domain is later extradited, and the provisional security values become unusable.

At 804 and 806, the security module manufacturer works cooperatively with an issuer-controlled computing server 184 to deliver configuration scripts where a secure domain is created in security module 114. If the scripts are delivered at manufacturing time, the security module manufacturer performs the act directly on the secure module under production, which delivers relevant EIDs, AIDs, and secure values information to the issuer-controlled computing server 184, which the issuer-controlled computing server 184 will use later to assign and administer the secure domain.

In some cases, the security module 114 is formed having one unassigned secure domain; in other cases, the security module manufacturer forms a plurality of unassigned secure domains in the security module. The EID generated by the security module manufacturer is stored in the memory of the security module 114, and each of the unassigned secure domains is given an AID. In some cases, the security module manufacturer will create a plurality of secure domains in the security module 114, but fewer than all of the plurality of secure domains will be provided with an AID. In these cases, at some point in the future, after the security module 114 is deployed, one or more of the unassigned secure domains that does not have a loaded AID may be provided with an AID.

In addition to the unassigned secure domains, the security module manufacturer also forms issuer-controlled secure domain properties in the security module 114 along with other structures not discussed in reference to FIG. 8.

Also at 804 and 806, some or all of the plurality of security values created to access the security module 114, the issuer-controlled secure domain, each of the unassigned secure domains, and other areas of the security module requiring secure access are stored in the issuer-controlled computing server 184 and in the security module 114. Particular scripts are also created and installed in the issuer-controlled secure domain of the security module 114. The scripts are controlled by the issuer-controlled computing server 184 during manufacture, during deployment, and at times after the security module 114 is deployed. The particular scripts are used to provision unassigned secure domains for use by service providers.

After 806, security module 114, if not already deployed, is ready for deployment. In some cases, access to one or more of the unassigned secure domains is granted to one or more service providers before deployment; in these and in other cases, access to one or more of the unassigned secure domains is granted to one or more service providers after deployment. In some cases, the execution of the security application 158 on a mobile device acts as a trigger to perform the key exchange ceremony at 808. That is, for example, a user of a mobile device may download a particular security application provided by a service provider. When the user executes the application, the security application 158 will form a secure communication with the service provider computing server 160. At this point, the service provider computing server 160 initiates the key exchange ceremony at 808 in order to gain access to an unassigned secure domain on the security module 114 of the user's mobile device.

At 808, the key exchange ceremony is performed between the service provider computing server 160 and either or both of the issuer-controlled computing server 184 and the security module manufacturer. The particular computing devices that conduct the key exchange ceremony at 808 may be determined by a particular business model associated with granting access to the secure domains. The key exchange ceremony entails the secure transfer of particular security values from whichever entity has control of the unassigned secure domain to the service provider computing server 160. When the service provider computing server 160 receives the security value, the service provider computing server is able to access at least one secure domain on the security module 114.

At 810, 812, and 814, the service provider computing server 160 passes communications to and from the security application 158 operating on the mobile device. The security application 158 is appropriately configured to cooperatively communicate with the security module 114. At 810, a key rotation procedure initiates the secure communications between the service provider computing server 160 and the security module 114 via the security application 158. The communications between the service provider computing server 160 and the mobile device may be implemented via an HTTPS server that encrypts data using the rotated keys. As discussed herein, the security application 158 can communicate with the security module 114 via any useful communication protocol such as Bluetooth, NFC, OM-API, or some other protocol. The security module 114, which holds rotated keys from the service provider, is able to decrypt data from the service provider computing server 160, and encrypt data that will be sent back to the service provider computing server 160. Due to the key rotation procedure at 810, the encrypted data passed between the security module 114 and the service provider computing server 160 remain secret to every other party and entity, including the security module manufacturer, and the issuer-controlled computing server 184.

At 812, the service provider computing server 160 passes security applications and security application data to the security module via the security application 158 executing on the mobile device. The data may be passed secretly via the secure communications described herein.

After completion of the configuration phase at 812, the security module 114 is configured for use such as in the merchant infrastructure (e.g., point-of-sale (POS) terminal) without a need to remain connected to the security application 158 or the service provider computing server 160

At 814 normal operations are permitted. In this way, the user of the mobile device is able to securely communicate secret data stored on the security module 114 with the service provider computing server 160. If the service provider is a transportation services provider, for example, the user may be able to securely pay taxi fare, train fare, update parameters (e.g., expiration dates, PIN codes) or the like. The user may also be able to securely set up travel reservations, or perform other functions associated with the goods and services provided by the particular service provider. Similarly if the service provider is a medical health provider, the user may be able to enter medical or other health-related data into their mobile device, and the communications between the mobile device and the service provider will be conducted securely. A wide range of other service providers and secure communication applications are considered.

Figure 9A:
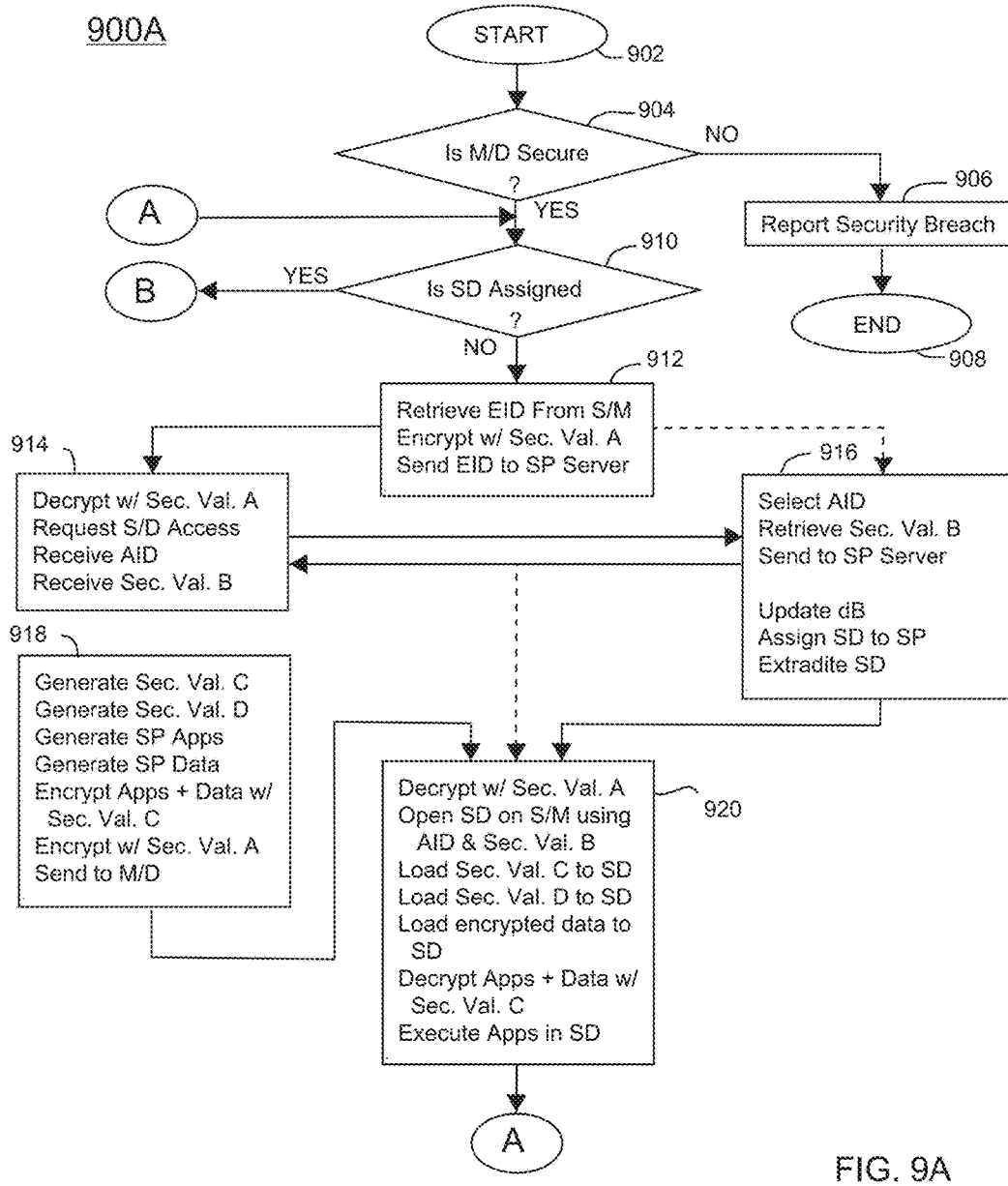
FIG. 9A is a first flowchart portion illustrating administration and use of a service provider secure domain.
Figure 9B:
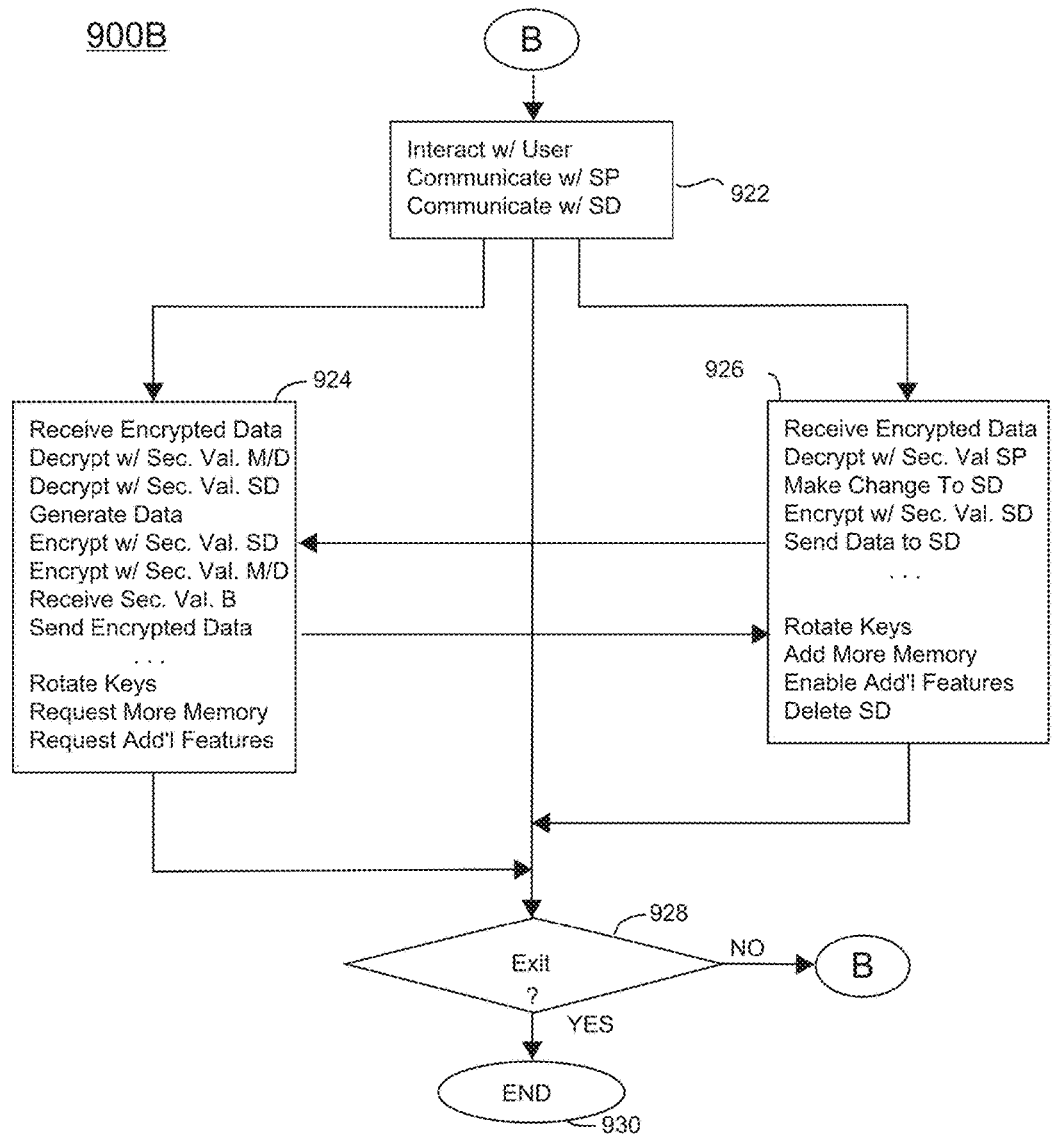
FIG. 9B is a second flowchart portion illustrating administration and use of a service provider secure domain.

FIG. 9A is a first flowchart portion 900A illustrating administration and use of a service provider secure domain, and FIG. 9B is a second flowchart portion 900B illustrating administration and use of a service provider secure domain.

In FIG. 9A, processing begins at 902. In this case, a user is operating a mobile device. The mobile device is associated with a security module (e.g., a SIM card, a UICC card, a personal device with a proximity connection, or the like), and the security module has a memory (e.g., a non-volatile memory) that has been particularly configured. The memory in the security module may be configured having one, two, or some other plurality of unassigned secure domains. Each of the secure domains may be accessible via a respective security value such as a security key. In some cases, this is a first security value (e.g., a first security key).

In some embodiments, the security module is assigned a unique electronic identifier (EID) such as an embedded UICC identifier. In these embodiments, and other embodiments, each of the unassigned secure domains may have assigned thereto a unique application identifier (AID). The combination of the EID and AID is sufficient to allow a programmatic function operating external from the secure domain to uniquely identify each unassigned secure domain in the security module. Along these lines, the first security value may be associated with (i.e., formed based on) the EID, the AID, a combination of the EID and AID, a combination of the EID and AID along with some other value, or by some other means. Accordingly, the first security value of each unassigned secure domain may be different from each other first security value.

Accessing the secure domain may include a procedure wherein a particular software program or function presents the first security key to a function that is operating in an issuer-controlled secure domain, which is also configured in the memory of the security module. The first security value may be associated with a public key infrastructure (PKI), and accordingly, the passing, forming, and matching of particular keys is used to verify the integrity of one or more entities communicating with each other.

The issuer-controlled secure domain may include particular functional logic, such as programmatic software applications, electronic circuitry, or some combination thereof to provision each of the unassigned secure domains with at least one second security value. In some cases, the issuer-controlled secure domain is permitted to read and write data to unassigned secure domains, and the issuer-controlled secure domain is restricted from reading and writing data to at least some portion of the secure domain after the secure domain is assigned to a service provider.

To facilitate the transfer of data into and out of the security module, the security module may include a Bluetooth, NFC, ISO, or some other communication interface. The security module may also include a processing unit that is coupled to both the memory and the communication interface.

At 902, the user may download a software application such as a mobile payment security application, a government services application, a transportation application, a health application, or some other application that is enabled with an ability to securely pass secret data output from or into the mobile device.

At 904, the software application executing on the mobile device attempts to determine whether the mobile device is secure. One or more techniques known to those of skill in the art can determine when a phone is rooted, when a phone memory has been tampered with, when a hacking attempt has been detected, or when some other action or operation has rendered the mobile device insecure. If the mobile device is determined to be insecure by the software application, processing passes to 906 where a report of the security breach, an alert, or some other operation may take place.

After 906, processing falls to 908, and the software application terminates. At 908, some particular actions may occur, such as encrypting some or all of the data in the security module, deleting data on the mobile device or the security module, providing a human detectable alert through the mobile device (e.g., visual, audio, tactile, or the like).

If the mobile device is secure at 904, processing falls to 910 where the software application determines whether or not a secure domain has been assigned for use by the software application. In this way, every time the software application is instantiated, processing will pass through 904 and 910.

After the secure domain has been assigned, processing passes to "B," which is discussed with respect to FIG. 9B.

If a secure domain has not been assigned, such as when the software application is being run for a first time, processing will fall to 912.

At 912, the mobile device will attempt to request service from a computing server operated by or on behalf of the service provider associated with the software application. Cooperative with the request for service, the particular user may interact with the mobile device. For example, in some cases, a touchscreen or other human input device (HID) cooperates with visual or audio cues generated by the software application. The user may be asked to select a particular service (e.g., utility, payment, travel, or some other service). The user may be asked to select a particular security module (e.g., SIM1, SIM2, or some particular security module available for use by their mobile device). The user may be asked to enter personal information such as a personal identification number (PIN), which is used to identify the user to the mobile device when the software application is instantiated.

In cooperation with the mobile device attempting to request service at 912, the software application may retrieve the EID or some other information that uniquely identifies the security module. The EID or other information may be encrypted with a particular security value (i.e., Sec. Val. A in FIG. 9A) and sent to the remote computing server operated by or on behalf of the service provider. Since the software application operating on the mobile device was provided by or is otherwise associated with the service provider, the service provider remote computing server in the mobile device may communicate securely, using shared keys, an HTTPS connection, or other secure mechanisms.

At 914, the remote computing server operated by or on behalf of the service provider may decrypt the data sent by the mobile phone, which will include the EID or other information that identifies the security module. The remote computing server may then transfer the EID or other information identifying the security module to an issuer-controlled computing server.

The issuer-controlled computing server may be operated by or on behalf of the manufacturer of the security module, an issuer of the security module, an MNO, or some other entity.

At 916, the issuer-controlled computing server will select a particular AID that identifies an unassigned secure domain formed in the security module. According to a contract, business relationship, or some other agreement, the secure domain identified by the AID will be assigned to the service provider. A security value (i.e., Sec. Val. B in FIG. 9A) that is associated with the selected secure domain will also be retrieved. The security value and the AID associated with the secure domain in the security module of the mobile device will be returned to the computing server associated with the service provider (i.e., processing returns to 914).

In some optional cases, the mobile device will communicate directly with the issuer-controlled computing server. This processing between 912 and 916 and the processing between 916 and 920 is illustrated with dashed lines. If this is the case, the AID and the security value, both of which are associated with the secure domain that will be assigned to the service provider, will be returned to the mobile device from the issuer-controlled computing server.

The issuer-controlled computing server will continue processing at 916. The issuer-controlled computing server may perform any number of optional functions. One function may include updating an associated database to indicate which secure domain of which security module will be assigned to which service provider. Other information may also be updated in the database such as a date stamp, a timestamp, details associated with the agreement to assign the secure domain, and many other details.

Another function that the issuer-controlled computing server may perform at 916 is to interact with the issuer-controlled secure domain on the security module. This interaction will generally include passing commands, data, or commands and data to an application executing within the issuer-controlled secure domain on the security module. The commands and data perform actions necessary to assign the secure domain to the service provider.

Yet one more function that the issuer-controlled computing server may perform at 916, if not performed at an earlier stage, is to extradite the secure domain. The extradition procedure removes some or all of the access to one or more areas of memory associated with the secure domain that is now assigned to the service provider. The extradition procedure provides sufficient assurance to the service provider that only the service provider will be able to access the memory of the assigned secure domain. Other functions may also be performed at 916.

The unassigned secure domains formed in the security module are assignable to a service provider. The issuer-controlled secure domain may include functions that permit or otherwise carry out the assignment procedure. In some cases secure domains are assigned by the manufacturer of the security module, by an issuer of the security module, by a mobile network operator, or by some other entity. In some cases, a service provider may be assigned to an unassigned secure domain after the security module is deployed in the field, such as when the security module is installed in or otherwise associated with a mobile device, and a user owns the mobile device, and the user is enabling the mobile device to perform additional functionality. Accordingly, an issuer-controlled computing server may be configured to talk to tens, hundreds, thousands, or even millions of mobile devices that have security modules loaded with the types of unassigned secure domains and issuer-controlled secure domains discussed in the present disclosure.

Processing falls to 920.

After the processing at 914 by the service provider computing server, processing continues in both the software application executing on the mobile device and in the service provider computing server.

At 918, the service provider computing server may generate additional security values (i.e., Sec. Val. C and Sec. Val. D in 918 at FIG. 9A), and may generate particular service provider applications and service provider data that will be loaded into the assigned secure domain in the security module. The service provider computing server may encrypt the applications and data with a particular security value (i.e., Sec. Val. C in 918 at FIG. 9A). The service provider may then further encrypt encrypted data with a security value shared with the software application executing on the mobile device, and the twice-encrypted data is delivered to the mobile device.

Processing in the mobile device at 920 continues with information from the service provider computing server, the issuer-controlled computing server, or both computing servers.

At 920, when information is received from the service provider computing server, the mobile device decrypts the information with the correct security value (i.e., Sec. Val. A in 920 at FIG. 9A).

At 920, the software application executing on the mobile device opens the assigned secure domain on the security module using the AID and security value provided by the issuer-controlled computing server. One or more additional security values may also be loaded into the secure domain. Using a particular security value, the applications and data provided by the service provider computing server may be decrypted using functions loaded in the assigned secure domain, and the applications and data may then be used in the assigned secure domain.

After loading, one or more applications provided by, and associated with, the service provider computing server may be executed in the assigned secure domain. At this point, the security module associated with the mobile device has been deployed in the field. The secure domain has been assigned by the issuer-controlled computing server, and the secure domain is no longer available for assignment to a different service provider.

Processing falls back to "A," which continues with operation of the software application on the mobile device at 910. In this case, since the secure domain has now been assigned and provisioned, processing advances to "B," which is presented in FIG. 9B.

Turning to FIG. 9B, processing begins at "B," which falls through to 922.

At 922, the software application executing on the mobile device will interact with the user. The user may use a PIN code to access the application or particular features within the application. The user may enter credit card information (e.g., a credit card number, an expiration date, a security number associated with the physical credit card, and the like). The user may enter health information, biometric information, banking information, or any other type of information associated with the software application and the service provider.

The software application executing on the mobile device may communicate with the service provider computing server, which performs processing at 924. In addition, or in the alternative, the software application executing on the mobile device may communicate with the issuer-controlled computing server, which performs processing at 926. Correspondingly, the service provider computing server and the issuer-controlled computing server may communicate with each other.

At 924, the service provider computing server will interact with the software application executing on the mobile device. In some cases, the communication is between the service provider computing server and the higher functions of the software application executing on the mobile device. In other cases, the communication is between the service provider computing server and functions executing in the assigned secure domain of the security module. Accordingly, processing in 924 includes the receipt of encrypted data and the decryption of data with a security value associated with the mobile device and the decryption of data with a security value associated with the secure domain.

Additional processing at 924 includes the generation, storage, analysis, and other operations on data within the service provider computing server. The service provider computing server may perform key rotation functions to maintain secure communications between the software application on the mobile device and functions operating in the secure domain. In addition, the service provider computing server may request more memory in the secure domain. In this case, the service provider computing server accesses administrative functions of the issuer-controlled computing server to perform the request, and the issuer-controlled computing server carries out or denies the request in processing at 926. Other features may also be requested, deleted, or otherwise managed by the secure service provider computing server.

At 926, the issuer-controlled computing server is also arranged to receive encrypted data, decrypt the encrypted data with a security value associated with the service provider, make changes to the secure domain, encrypt data with a secure value associated with the secure domain, and send the data to the secure domain either directly or via the service provider computing server.

Additional processing in the issuer-controlled computing server may include key rotation procedures, and may also include the addition, deletion, or alteration of particular characteristics associated with memory. Further additional processing may include enabling additional features, loading additional features, correcting additional features, and the like in the functions stored in the secure domain. In some cases, the secure domain may be deleted, encrypted, locked, or otherwise managed in a secure state.

In some cases, processing in the software application operating on the mobile device, processing in the service provider computing server, and in the alternative, or in addition, processing in the issuer-controlled computing server associated with the particular security module may be desirably terminated. At 928, if processing is to end, processing ends at 930. Alternatively, the processing may be ongoing and return to "B."

One implementation of the architecture described herein is now considered. In the architecture, a user wears a smart exercise band. The smart exercise band performs expected features such as counting steps, measuring pulse, detecting a level of motion, a quality of sleep, and other functions. In this case, the manufacturer of the exercise band would like to provide users with functionality to pay for services at a coffee shop, for example.

Using the conventional technology, the manufacturer of the exercise band would need to purchase, construct, or otherwise contract for the services of a trusted service manager (TSM), and the exercise band manufacturer would also require integration of services of a credit services provider TSM. This integration is, as previously described, very complex and expensive using conventional technologies. Under the new systems described herein, however, the exercise band may be formed to include a security module such as security module 114 of FIG. 4 in the exercise band.

The terms "secure value" and "secure data," as used herein, refer to electronically stored information that a typical user would desire to keep from being generally known or otherwise freely available. The two terms may be used interchangeably as directed by the context of the usage. In some cases, the secure information is discernible by a human seeing the information. In some cases, the secure information is indiscernible to a human and instead requires a computing device for interpretation and use. A non-limiting list of examples includes bank account numbers or account numbers associated with other financial institutions; credit card numbers and associated data; debit card numbers and associated data; birthdays; passwords; personal identification numbers (PINs); health information; private phone numbers or other private contact information; social security information; passport information; mobile account information; biometric data such as fingerprints, iris scans, and the like; tax identifiers or other information associated with taxes; registration information for vehicles, firearms, and other personal and real property; photographs or other media; videos or other multimedia; and any other type of information that a person or entity would desire to keep private (e.g., secret) and that can be stored electronically. Transient data created purposefully by a security module 114, a security software application, or some other service infrastructure to identify transactions, events, items, users, and the like may also be secure data. Other information that a typical user would desire to secure and control is also contemplated.

Security modules, such as security module 114 in FIG. 4, which may also be referred to herein as a subscriber identity module (SIM), is sometimes embodied as a small square or rectangle having one truncated corner. The SIM has at least one integrated memory device, and some limited computing functionality. The particular shape, electronic pin configuration, and operational characteristics of the SIM card are in some cases governed by one or more Global System for Mobile Communications (GSM) mobile communications standards.

In other cases, security modules are embodied as a Universal Integrated Circuit Card (UICC). The UICC is considered a newer generation SIM. The UICC is generally compatible with mobile communication systems that comply with 3G and 4G telecommunications standards as well as some non-GSM telecommunications standards. The UICC includes a computing processor, data storage memory, and executable software, which is often embodied in one or more applications that run on the computing processor. For example, a Universal Subscriber Identity Module (USIM) application provides activated profile functionality to identify the subscriber and associated contracted services to a mobile network services provider. A UICC is conventionally compatible with Universal Mobile Telecommunications Systems (UMTS), High Speed Packet Access (HSPA) systems, Long Term Evolution (LTE) systems, carrier detect multiple access (CDMA) systems, and other systems. The UICC may also provide applications for IP Multimedia Services Identity Module (ISIM) to secure mobile access to multimedia services and other non-telecom applications such as mobile payment services, financial services, banking services, private healthcare services, and the like.

In still other cases, an embedded mobile UICC (eUICC) device or some other logic in a mobile device performs the functions described herein with respect to the security module 114 in FIG. 4.

Non-limiting embodiments of computing devices such as the service provider remote computing server 160 (FIG. 6) associated with a service provider 132 and the issuer-controlled computing server 184 (FIG. 7) are referenced herein but not described in detail for the sake of brevity and simplicity. The computing devices are understood to include operative hardware found in conventional computing apparatuses such as one or more central processing units (CPUs), volatile and non-volatile memory, serial and parallel input/output (I/O) circuitry compliant with various standards and protocols, wired and/or wireless networking circuitry (e.g., a communications transceiver), and the like.

Along these lines, the terms processor, processing unit, and the like are used in the present disclosure to refer to one or more processing units individually, shared, or in a group, having one or more processing cores (e.g., execution units), including central processing units (CPUs), digital signal processors (DSPs), microprocessors, micro controllers, state machines, and the like that execute instructions. For example, as used herein, a processing unit may include all or any portions of a host applications processor, a baseband processing unit, a security module processing unit, and other processing units in a single structure or a distributed structure.

In the present disclosure, various software applications, applets, and the like are discussed. The software discussed herein is formed of processor-executable instructions stored in a memory. The memory may be arranged in one configuration or another. The memory may be arranged to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

In the present disclosure the term "mobile device" is used to indicate a computing device capable of communicating through a wireless communications network such as a cellular mobile device network, a satellite mobile device network, or some other mobile device network. It is understood that the device capable of such communication may itself be mobile or otherwise portable. Conversely, the device capable of such communication may be temporarily or permanently stationary. As used herein, a mobile device may be embodied as cellular phone, a smartphone, a tablet, a laptop computer, a wearable computer, a motor vehicle computer, a home antitheft system, a telemetry system, or some other like device. The term mobile device as used herein is not intended to be limiting; instead, the term is used to help a reader understand various embodiments of the disclosure.

The term "logic," as used herein, may refer to circuitry, software, or a combination of circuitry and software.

As used herein, the term "module" refers to an electronic circuit, a processor (e.g., shared, dedicated, group, single core, multicore, or the like) and memory operative to execute one or more software or firmware programs, an application specific integrated circuit (ASIC), a combinational logic circuit, or some other individual or cooperative coupling of suitable components (either hardware or software) that provides the functionally described with respect to the module.

Non-limiting embodiments of computing devices are referenced herein but not described in detail for the sake of brevity and simplicity. The computing devices are understood to include operative hardware found in a conventional computing apparatuses such as one or more central processing units (CPUs), volatile and non-volatile memory, serial and parallel input/output (I/O) circuitry compliant with various standards and protocols, wired and/or wireless networking circuitry (e.g., a communications transceiver), and the like.

Flowcharts presented herein, even unconventional flowcharts wherein blocks are illustrated to communicate data, illustrate processes that may be used by embodiments of the devices described herein to create, assign, and use unassigned secure domains formed in a security module. In this regard, each described process may represent a module, segment, or portion of software code, which comprises one or more executable instruction for implementing the specified logical function(s). It should also be noted that in some implementations, the functions noted in the process may occur in a different order, may include additional functions, may occur concurrently, and/or may be omitted.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A security module having assigned thereto a unique electronic identifier (EID), comprising:
   a non-volatile memory having configured therein a plurality of unassigned secure domains, each of the plurality of unassigned secure domains having assigned thereto a unique application identifier (AID), each of the plurality of unassigned secure domains accessible via a respective first security value of a plurality of first security values;
   a communication interface arranged to receive first data, an identifier of a selected secure domain of the plurality of unassigned secure domains, and second data; and
   a processing unit coupled to the communication interface and the non-volatile memory, wherein the processing unit is arranged to:
      based on the identifier of the selected secure domain, direct delivery of the first data to the selected secure domain, wherein the first data is encrypted with a first security value of the plurality of security values, and wherein the first security value corresponds to a security value stored in the selected secure domain;
      decrypt the received first data, wherein the first data includes a second security value and a secure domain application;
      direct delivery of the second data to the selected secure domain, wherein the second data is encrypted with the second security value.

2. The security module of claim 1 wherein each respective first security value of each of the unassigned secure domains is different from each other first security value.

3. The security module of claim 1 wherein each first security value is associated with the AID of the respective unassigned secure domain.

4. The security module of claim 1, wherein the non-volatile memory further has configured thereon:
   functional logic to provision each of the unassigned secure domains with at least one second security value.

5. The security module of claim 4 wherein an issuer-controlled secure domain is permitted to read and write data to a first secure domain of the plurality of unassigned secure domains, and wherein the issuer-controlled secure domain is restricted from reading and writing data to at least some portion of the first secure domain after the first secure domain is assigned to a service provider.

6. The security module of claim 1 wherein each first security value is a security value associated with a public key infrastructure (PKI).

7. The security module of claim 1 wherein one unassigned secure domain of the plurality of unassigned secure domains is assignable to a service provider after the security module is deployed.

8. The security module of claim 1 wherein the communication interface conforms to a near field communication (NFC) protocol.

9. The security module of claim 1 wherein the security module is a universal integrated circuit card (UICC).

10. The security module of claim 1 wherein the security module is a subscriber identity module (SIM).

11. A system, comprising:
    a plurality of security modules, each of the plurality of security modules including:
       a communication interface arranged to receive first data, an identifier of a selected secure domain of the plurality of unassigned secure domains, and second data;
       a non-volatile memory having configured therein:
          a unique electronic identifier (EID) associated with the respective security module;
          a plurality of unassigned secure domains, each of the plurality of unassigned secure domains having assigned thereto a unique application identifier (AID), each of the plurality of unassigned secure domains accessible via a respective first security value of a plurality of first security values; and
          an issuer-controlled secure domain;
          functional logic to provision each of the unassigned secure domains with at least one second security value; and
       a processing unit coupled to the communication interface and the non-volatile memory, wherein the processing unit is arranged to:
          based on the identifier of the selected secure domain, direct delivery of the first data to the selected secure domain, wherein the first data is encrypted with a first security value of the plurality of security values, and wherein the first security value corresponds to a security value stored in the selected secure domain;
          decrypt the received first data, wherein the first data includes a second security value and a secure domain application;
          direct delivery of the second data to the selected secure domain, wherein the second data is encrypted with the second security value;
    at least one computing server; and
    at least one database associated with the at least one computing server, the at least one database arranged to store the plurality of first security values, wherein the at least one computing server is arranged to assign the selected secure domain of the plurality of unassigned secure domains of a selected security module of the plurality of security modules to a service provider by passing a selected first security value of the plurality of first security values to the service provider, the selected first security value corresponding to the respective first security value of the selected secure domain of the selected security module.

12. The system of claim 11 wherein the service provider is configured to generate the second security value, the second security value stored in the selected security module.

13. The system of claim 12 wherein a security application executing on a mobile device is configured to read data or write data to memory of the selected secure domain of the selected security module by associating the data with the generated second security value.

14. The system of claim 11 wherein the selected security module is associated with a mobile device.

15. The system of claim 14 wherein the service provider is a remote computing server, and wherein communications between the remote computing server and the mobile device conform to a secure hypertext transport protocol (HTTPS).

16. A method to provision a security module, the security module having a memory, the memory having configured therein a plurality of unassigned secure domains, each of the unassigned secure domains accessible via a respective first security value, the method comprising:

executing a security application on a mobile device associated with the security module;

establishing a secure communication connection between the mobile device and a service provider computing server;

receiving data encrypted with a first security value and an identifier of a selected secure domain of the plurality of unassigned secure domains from the service provider computing server, wherein the data encrypted with the first security value includes a second security value and a secure domain application;

delivering the data encrypted with the first security value and the identifier of the selected secure domain to the security module, the first security value corresponding to a security value stored in the selected secure domain;

receiving data encrypted with the second security value from the service provider computing server; and delivering the data encrypted with the second security value to the selected secure domain.

17. The method of claim 16, comprising:

decrypting the encrypted data with the secure domain application.

18. The method of claim 16 wherein the first security value is based on an application identifier (AID) assigned to the selected secure domain and an electronic identifier (EID) assigned to the security module.

19. The method of claim 16 wherein communications between the service provider computing server and the mobile device conform to a secure hypertext transport protocol (HTTPS).

20. The method of claim 16 wherein the security application is a mobile payment security application.

\* \* \* \* \*